US010261614B2

(12) United States Patent
Chuang et al.

(10) Patent No.: US 10,261,614 B2
(45) Date of Patent: Apr. 16, 2019

(54) TOUCH DISPLAY MODULE HAVING PRESSURE DETECTION MECHANISM

(71) Applicant: TPK Touch Solutions (Xiamen) Inc., Xiamen (CN)

(72) Inventors: Chih-Cheng Chuang, Hsinchu (TW); Tai-Shih Cheng, Taipei (TW); Shao Li, Xiamen (CN)

(73) Assignee: TPK Touch Solutions Inc., Taipei (TW)

( * ) Notice: Subject to any disclaimer, the term of this patent is extended or adjusted under 35 U.S.C. 154(b) by 4 days.

(21) Appl. No.: 15/206,307

(22) Filed: Jul. 10, 2016

(65) Prior Publication Data

US 2017/0010730 A1  Jan. 12, 2017

(30) Foreign Application Priority Data

Jul. 10, 2015 (CN) .......................... 2015 1 0404705

(51) Int. Cl.
*G06F 3/041* (2006.01)

(52) U.S. Cl.
CPC .......... *G06F 3/0414* (2013.01); *G06F 3/0416* (2013.01); *G06F 2203/04101* (2013.01)

(58) Field of Classification Search
CPC .................................................. G06F 3/0414
See application file for complete search history.

(56) References Cited

U.S. PATENT DOCUMENTS

| | | | | |
|---|---|---|---|---|
| 2013/0033450 A1* | 2/2013 | Coulson | ................... | G06F 3/044 345/174 |
| 2013/0154998 A1* | 6/2013 | Yang | ................... | H03K 17/9625 345/174 |
| 2014/0267128 A1* | 9/2014 | Bulea | ..................... | G06F 3/044 345/174 |
| 2016/0062497 A1* | 3/2016 | Huppi | ................... | G06F 3/0414 345/177 |

* cited by examiner

*Primary Examiner* — Ram A Mistry
(74) *Attorney, Agent, or Firm* — Cooper Legal Group, LLC

(57) ABSTRACT

A touch display module having a pressure detection mechanism is provided. The touch display module includes a 3-D (three-dimensional) sensor and a 3-D controller. The 3-D sensor includes touch units and at least one pressure sensing unit. The 3-D controller includes a driver and a driving pulse processor. The driver provides a pressure scan pulse to the pressure sensing unit and a touch scan pulse to the touch units in combination with the driving pulse processor. The present disclosure further provides a driving method corresponding to the touch display module having the pressure detection mechanism including steps of: providing pressure scan pulses to the pressure sensing unit by the driver in combination with the driving pulse processor and providing touch scan pulses to the touch units in combination of the driving pulse processor by the driver.

20 Claims, 14 Drawing Sheets

TOUCH DISPLAY MODULE HAVING PRESSURE DETECTION MECHANISM

RELATED APPLICATIONS

This application claims priority to China Application Serial Number 201510404705.4, filed Jul. 10, 2015, which is herein incorporated by reference.

BACKGROUND

Technical Field

The present disclosure relates to a touch technology. More particularly, the present disclosure relates to a touch display module having a pressure detection mechanism and a driving method of the same.

Description of Related Art

As the manufacturing process advances, the touch display module successfully integrates the touch panel and the display panel. The user can directly control an electronic device to operate the required task by using the touch panel. In general, the touch sensing units and the pixel units on the touch display module are arranged on a two-dimensional (2-D) plane as an array and determine the time period to refresh the display frame and the time period to detect the touch points based on scan pulse signals.

For a general flat display panel, the display frame is composed by two-dimensional pixels. A TFT-LCD display panel formed by a LCD module that includes TFTs is taken as an example for explanation, the display panel includes a multiple arrays of pixel units. If the frame is displayed in colors, each of the pixels includes three sub-pixel units to display colors of red, green and blue. Each of the pixel units includes at least one TFT as a driving switch. In the aspect of driving mechanism, the display panel includes a gate driver and a source driver, in which the gate driver generates gate scan pulse according to the signal to be displayed to control the displayed color of the pixel units. The source driver generates source scan pulses to control the color display intensity of the pixel units according to the signal to be displayed.

The touch panel correspondingly includes a touch driver to generate a touch driving signal to control the time period of the detection of the touch points.

In order to enhance the function of the touch display module, some of the touch panels nowadays are equipped with pressure sensor that includes a plurality of pressure sensing units to detect a value of a pressure of the user, wherein different values of the pressure corresponds to different functions. For example, different values of the pressure of a single touch point correspond to a multiple of functions. By disposing such pressure sensing units, more vivid user experiences are provided to the user. A pressure driver is correspondingly disposed in current touch display module to generate pressure driving scan pulses to control the time period of the detection of the pressure value.

Though the function of the touch display module that integrates the touch panel and the display panel is vivid, a severe problem exists. Since the degree of integration of the touch display module increases, the components and the wires therein become more and more crowded and result in severe interference of the electrical signals. The detection accuracy of the touch point position and the pressure value decreases. How to overcome the issues of the interference among signals when the pressure sensing units are disposed in the touch panel and when the touch panel and the display panel are integrated is a major problem to be solved in the industry.

SUMMARY

An aspect of the present disclosure is to provide a touch display module having a pressure detection mechanism. The touch display module includes a plurality of pixel units disposed in an array and a 3-D sensor that comprises a plurality of touch units and at least one pressure sensing unit, the pixel units receive a gate driving scan pulse to control a refresh time period of the displayed color; the touch units receive a touch scan pulse to control a time period of the detection of a touch point; the at least pressure sensing unit receives a pressure scan pulse to control a time period of the detection of a pressure value, voltage transition points of the gate driving scan pulse, the touch scan pulse and the pressure scan pulse are separated from each other.

Preferably, the gate driving pulse, the touch scan pulse and the pressure scan pulse are provided alternatively in different time periods, and pulse widths of the touch scan pulse and the pressure scan pulse are not wider than the pulse width of the gate driving pulse.

Preferably, the touch scan pulse and the pressure scan pulse are provided in the same time period as the time period that the gate driving pulse is provided.

Preferably, the touch scan pulse and the pressure scan pulse are provided either in the same time period or in separated time periods.

Preferably, the touch display module having the pressure detection mechanism further includes at least one mask layer, the pixel units are disposed at one side of the mask layer, and the touch units and the at least one pressure sensing unit are disposed at the other side of the mask layer.

Preferably, a mask layer is disposed between the touch units and the at least one pressure sensing unit.

Preferably, the touch display module further includes a first pressure layer having the at least one of the pressure sensing unit disposed thereon and a second pressure layer having the at least one of the pressure sensing unit disposed thereon.

Preferably, the pressure scan pulse received by the pressure sensing unit of the first pressure layer, the pressure scan pulse received by the pressure sensing unit of the second pressure layer and the touch scan pulse received by the touch units are provided either in the same time period or in separated time periods.

Preferably, the gate driving pulse, the touch scan pulse and the pressure scan pulse are provided directly or indirectly by the same driver.

Preferably, the at least one pressure sensing unit comprises a plurality of the pressure sensing units corresponding to inner resistors RF0, RF1, RF2, . . . , RFn, resistors RC0, RC1, RC2, . . . , RCu are disposed around the pressure sensing units each matching one of the pressure sensing units, the resistors RF0, RF1, RF2, . . . . , RFn and the resistors RC0, RC1, RC2, . . . , RCn are resistors in reference to each other, and the touch display module further comprises a pressure signal processor that comprises a resistor Ra, a resistor Rb, a multiplexer MUX1 and a multiplexer MUX2, the resistors RF0, RF1, RF2, . . . , RFn are coupled to input terminals of the multiplexer MUX1, the resistors RC0, RC1, RC2, . . . , RCn are coupled to the input terminals of the multiplexer MUX2 and the multiplexer MUX1 and the multiplexer MUX2 select a matching one of the resistors RFn and RCn respectively to form a Wheatstone bridge with the resistors Ra and Rb, and resistance value changes of the resistors RF0, RF1, RF2, . . . . , RFn are related to a pressure value performed thereon.

Preferably, the touch display module having the pressure detection mechanism further includes a reference resistor and a common resistor, wherein the reference resistor, the common resistor and the at least one pressure sensing unit form a Wheatstone bridge having an output terminal electrically coupled to an operational amplifying circuit, and an output terminal of the operational amplifying circuit is electrically coupled to a filtering circuit and an ADC circuit sequentially.

Preferably, the touch display module having the pressure detection mechanism further includes a touch signal receiving module, a pressure signal receiving module and an integrated processor, wherein the plurality of touch units is electrically coupled to the touch signal receiving module, the pressure sensing unit is electrically coupled to the pressure signal receiving module, and the touch signal receiving module and the pressure signal receiving module are electrically coupled to the integrated processor.

Preferably, the touch units are defined by a plurality of first direction touch electrodes and a plurality of second direction touch electrodes.

Preferably, the first direction touch electrodes are parallel to each other and the second direction touch electrodes are parallel to each other, the first direction touch electrodes, the second direction touch electrodes and at least one of the pressure sensing unit are disposed on a same surface, the first direction touch electrodes and the second direction touch electrodes have a certain angle therebetween, wherein a non-touch region is disposed between two of the first direction touch electrodes, the at least one pressure sensing unit is disposed in the non-touch region, an overlapped region exists among the at least one pressure sensing unit, the first direction touch electrodes and the second direction touch electrodes, and an insulating bulk is disposed between two of the first direction touch electrodes and the second direction touch electrodes within the overlapped region.

Preferably, the first direction touch electrodes, the second direction touch electrodes and the at least one pressure sensing unit are disposed on a same surface, no overlapped region exists between two of the first direction touch electrodes and the second direction touch electrodes, a non-touch region is disposed either between two of the first direction touch electrodes, between two of the second direction touch electrodes or between two of the first direction touch electrodes and the second direction touch electrodes, and the at least one pressure sensing unit is disposed in the non-touch region.

Preferably, the first direction touch electrodes are parallel to each other and the second direction touch electrodes are parallel to each other, the first direction touch electrodes and the second direction touch electrodes are disposed on different substrate layers or disposed on different surfaces of the same one of the substrate layers, a non-touch region exists among the first direction touch electrodes, and the at least one pressure sensing unit is disposed in the non-touch region.

Preferably, the touch display module having the pressure detection mechanism further comprises a cover plate and a touch display panel, from top to bottom, the touch display panel comprises a top polarizer, a top substrate, a liquid crystal layer, a bottom substrate and a bottom polarizer, the first direction touch electrodes and the second direction touch electrodes are disposed on a bottom surface of the top polarizer, a top surface or a bottom surface of the top substrate, a top surface or a bottom surface of the bottom substrate and a bottom surface of the bottom polarizer.

Preferably, the at least one pressure sensing unit is complement to the first direction touch electrodes and/or the second direction touch electrodes.

Another aspect of the present disclosure is to provide a driving method of a touch display module having a pressure detection mechanism, wherein the touch display module having the pressure detection mechanism includes a plurality of pixel units and a 3-D sensor, and the 3-D sensor includes a plurality of touch units and at least one pressure sensing unit. The driving method includes the steps outlined below. S1: providing a gate driving scan pulse to the pixel units to control a refresh time period of the displayed color; S2: providing a touch scan pulse to control a time period of the detection of a touch point; S3: providing a pressure scan pulse to control a time period of the detection of a pressure value; wherein voltage transition points of the gate driving scan pulse, the touch scan pulse and the pressure scan pulse are separated from each other.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In order to make the objects, technical solutions and advantages of the present invention apparent, diagrams in combination of examples are used to describe the present invention in further detail. It should be understood that the specific embodiments described herein are merely examples for explaining the present invention and are not intended to limit the present invention.

Figure 1A:
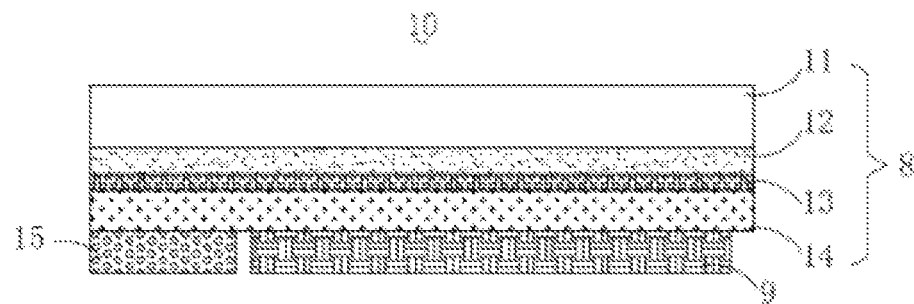
FIG. 1A is a diagram illustrating the layer structure of a touch display module having the pressure detection mechanism in the first embodiment of the present invention.

Reference is now made to FIG. 1A. From top to bottom (the terms of top, bottom, left and right in the present invention merely refer to the relative positions in the designated diagram and do not refer to the absolute positions), a touch display module 10 having a pressure detection mechanism in a first embodiment of the present invention includes a touch panel 8, a display panel 9 and a signal processing circuit 15. The touch panel 8 and the display panel 9 are electrically coupled to the signal processing circuit 15 through conductive wires.

From top to bottom the touch panel 8 includes a top substrate 11, an adhesive layer 12, 3-D sensors 13 and a substrate layer 14. The 3-D sensors 13 and the signal processing circuit 15 are electrically coupled through a conductive wire (not illustrated).

Figure 1B:
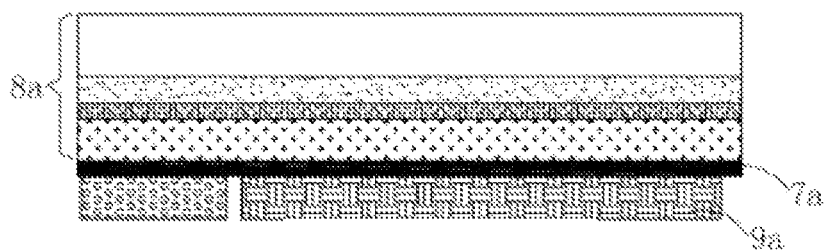
FIG. 1B is a diagram illustrating a first variation of the layer structure of the touch display module having the pressure detection mechanism in the first embodiment of the present invention.

The touch display module 10 having the pressure detection mechanism further selectively includes at least one mask layer. When at least one mask layer is added, different variations of the layer structure of the touch display module 10 having the pressure detection mechanism are illustrated in FIGS. 1B, 1C and 1D:

As illustrated in FIG. 1B, a mask layer 7a is disposed between the touch panel 8a and the display panel 9a. The mask layer 7a is a metal layer to lower the signal interference between the touch panel 8a and the display panel 9a.

Figure 1C:
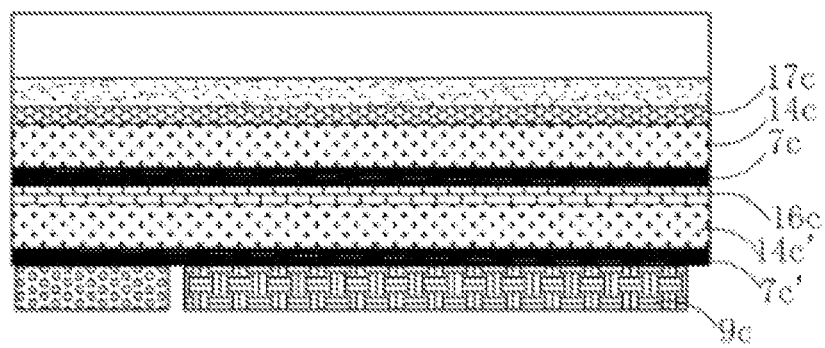
FIG. 1C is a diagram illustrating a second variation of the layer structure of the touch display module having the pressure detection mechanism in the first embodiment of the present invention.

As illustrated in FIG. 1C, the 3-D sensors (not labeled) includes pressure sensors 16c and touch sensors 17c. The touch sensors 17c are disposed on the first substrate layer 14c, and the pressure sensors 16c are disposed on the second substrate layer 14c'. A first mask layer 7c is disposed between the pressure sensors 16c and the touch sensors 17c. A second mask layer 7c' is disposed between the pressure sensors 16c and the display panel 9c. The first mask layer 7c and the second mask layer 7c' can lower the signal interference between the pressure sensors 16c and the touch sensors 17c and between the pressure sensors 16c and the display panel 9c. Actually, one can choose to dispose only one of the first mask layer 7c and the second mask layer 7c'. The positions of the pressure sensors 16c and the touch sensors 17c can be interchanged.

Figure 1D:
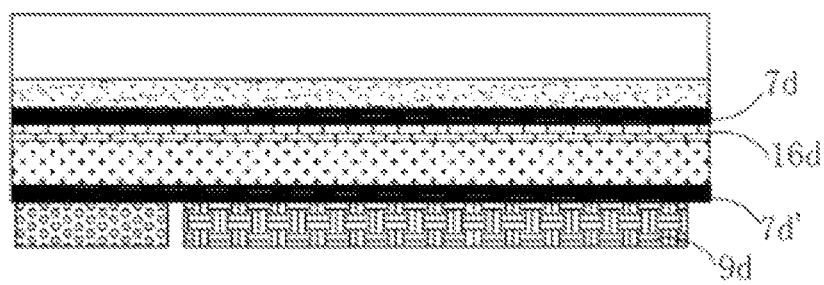
FIG. 1D is a diagram illustrating a third variation of the layer structure of the touch display module having the pressure detection mechanism in the first embodiment of the present invention.

As illustrated in FIG. 1D, the 3-D sensors (not labeled) include pressure sensors 16d and touch sensors (not illustrated). The touch sensors are integrated in the display panel 9d (with an in-cell structure or an on-cell structure). A first mask layer 7d and a second mask layer 7d' are respectively disposed above and below a plane that the pressure sensors 16d locate. The first mask layer 7d and the second mask layer 7d' can lower the signal interference between the pressure sensors 16d and the display panel 9d that includes the integrated touch sensors. Actually, instead of the embodiment that both of the first mask layer 7d and the second mask layer 7d' are disposed, the embodiment that only one of the first mask layer 7d and the second mask layer 7d' is disposed can be used as well.

The top substrate 11 can be considered as the touch top cover of a conventional touch panel. The so-called top cover includes a touch operation surface and a component assembling surface. The touch operation surface is configured to receive touch operation performed by finger or stylus. The component assembling surface is used to assemble the touch electrode components or the display module.

The adhesive layer 12 can selectively use OCA (optical clear adhesive) or LOCA (liquid optical clear adhesive).

The material of the substrate layer 14 can be a flexible substrate or a rigid substrate. The substrate layer 14 serves as a supporting layer of the 3-D sensors 13. The substrate layer 14 adheres to a bottom surface of the top substrate 11 through the adhesive layer 12. It is appreciated that a better pressure sensing result of the 3-D sensors 13 is obtained by using a flexible substrate as the supporting layer.

The signal processing circuit 15 is disposed under the substrate layer 14. However, the position of the signal processing circuit 15 is not limited thereto. The signal processing circuit 15 can also be disposed above the substrate layer 14 or at one side of the substrate layer 14.

Figure 2:
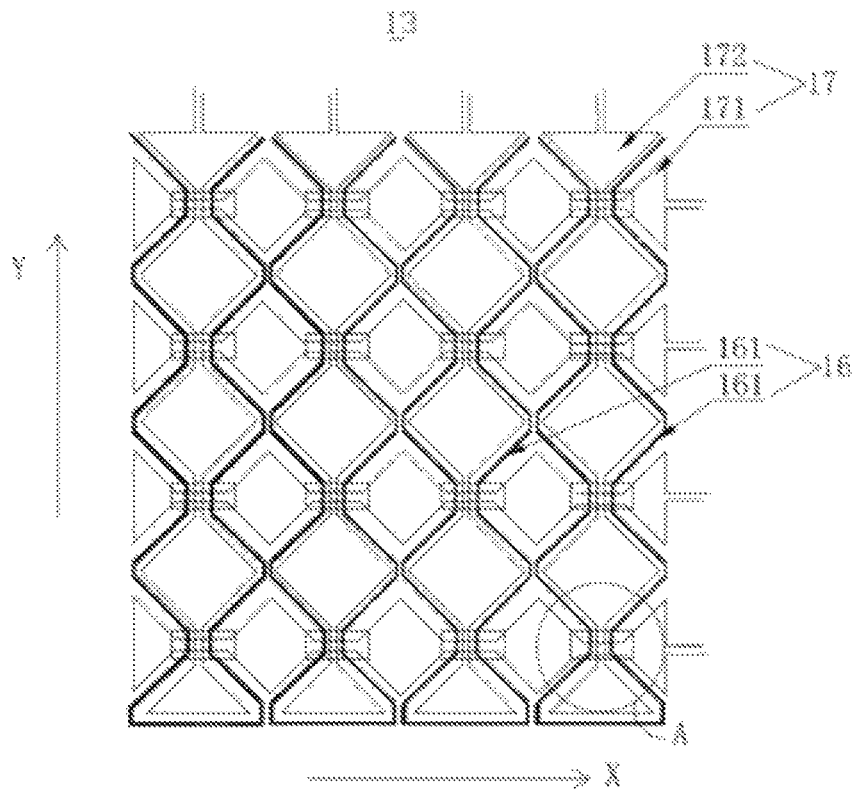
FIG. 2 is a diagram illustrating a planer structure of the electrode pattern layer of the touch display module having the pressure detection mechanism in the first embodiment of the present invention.
Figure 3:
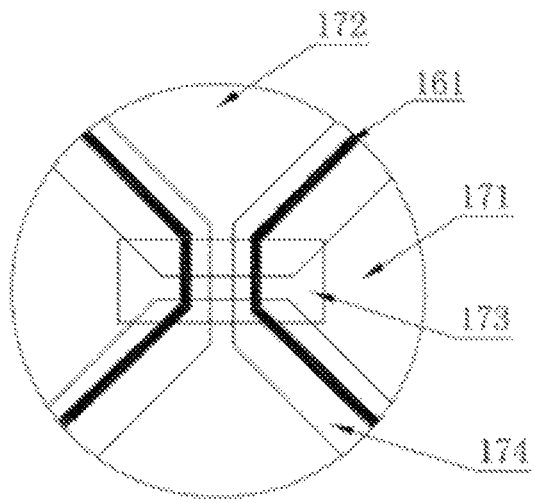
FIG. 3 is a diagram illustrating an enlarged structure of the part A in FIG. 2.
Figure 18A:
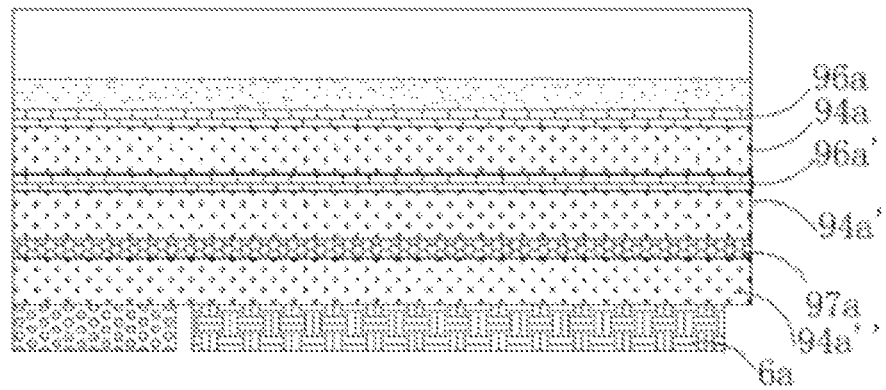
FIG. 18A is a diagram illustrating a first variation of the layer structure of the touch display module having the pressure detection mechanism in the ninth embodiment of the present invention.

Reference is now made to FIG. 2 and FIG. 3. 3-D sensors 13 are disposed on the electrode pattern layer 13 and include pressure sensors 16 and touch sensors 17. The pressure sensors 16 and the touch sensors 17 can be located on a same surface (as illustrated in FIG. 2 and FIG. 3) or can be separated (as illustrated in FIG. 18A). The pressure sensors 16 include at least one pressure sensing unit 161 (or a force sensing unit). It is noted that the pressure sensing unit may be abbreviated as "PSU". The touch sensors 17 include touch units: a plurality of first direction touch electrodes 171 along an X direction and a plurality of second direction touch electrodes 172 along a Y direction (in FIG. 2, four first direction touch electrodes 171, four second direction touch electrodes 172 and four pressure sensing units 161 are illustrated as an example, wherein in practical application, the number is not limited thereto, and the number of the pressure sensing units 161 can be less than, equal to or more than the number of the first direction touch electrodes 171 or the number of the second direction touch electrodes 172. In various embodiments, each of the pressure sensing units 161 includes at least two routings disposed in parallel and neighboring to each other to accomplish a doubling of the number to increase the pressure detection ability). In the present embodiment, the X direction and the Y direction are orthogonal. However, the angle between the X direction and the Y direction is not limited thereto. The first direction touch electrodes 171 and the second direction touch electrodes 172 are orthogonal. In an overlapped region of the first direction touch electrodes 171 and the second direction touch electrodes 172, an insulating bulk 173 is disposed. Besides the overlapped region, a non-touch region 174 is disposed among the first direction touch electrodes 171, and the pressure sensing units 161 are disposed in the non-touch region 174. The insulating bulk 173 also exists in the overlapped region between two of the pressure sensing units 161 and the second direction touch electrodes 172. In other words, the insulating bulk 173 covers the overlapped region among the first direction touch electrodes 171, the second direction touch electrodes 172 and the pressure sensing units 161 such that the first direction touch electrodes 171, the second direction touch electrodes 172 and the pressure sensing units 161 are electrically insulated from each other. In a best condition, the shape of the pressure sensing units 161 complements the shape of the first direction touch electrodes 171 and the second direction touch electrodes 172. The material of the first direction touch electrodes 171, the second direction touch electrodes 172 and the pressure sensing units 161 can be ITO, metal conductive lines or silver nano-wire conductive layer. In the present embodiment, if the first direction touch electrodes 171, the second direction touch electrodes 172 and the pressure sensing units 161 all use the ITO manufacturing process, the design of the manufacturing process can be simplified.

The coordinates on the X direction and the Y direction of the positions of a multiple of touch points are determined by the first direction touch electrodes 171 and the second direction touch electrodes 172. The pressure sensing units 161 interlaced with the first and the second direction touch electrodes detect the pressure.

The display panel 9 includes a pixel array (not labeled) that includes pixel units 91 (labeled in FIGS. 5A and 5B) disposed in the array. Each of the pixel units 91 controls the display result according to the display signal. The so-called controlling of the display result includes the controlling of the displayed color and the controlling of the displayed color intensity.

Figure 4A:
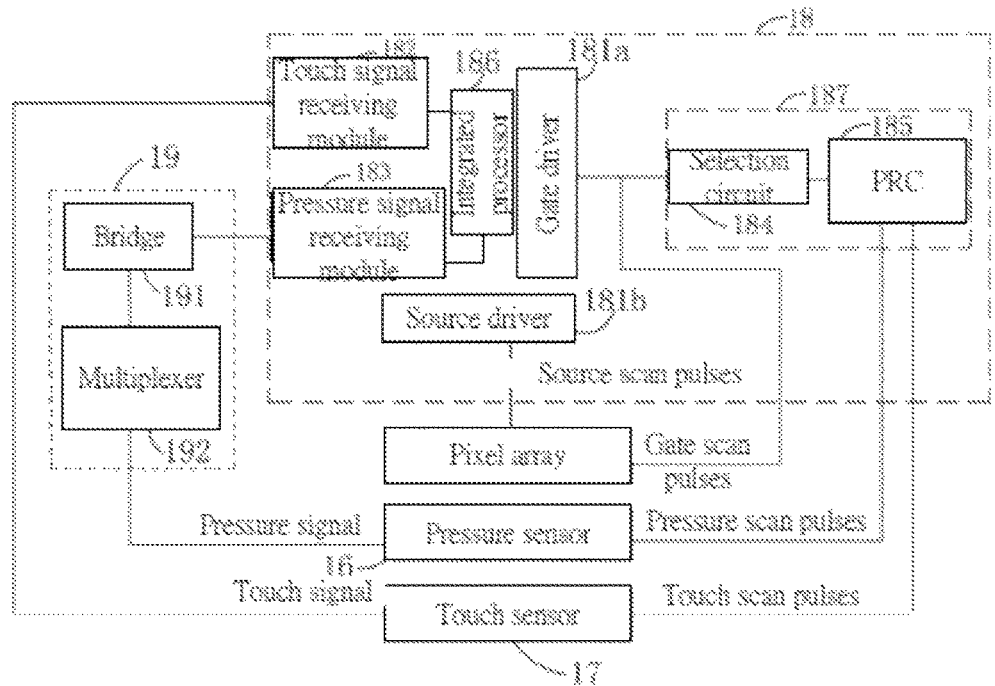
FIG. 4A is a diagram illustrating a circuit structure module of the touch display module having the pressure detection mechanism in the first embodiment of the present invention.
Figure 5A:
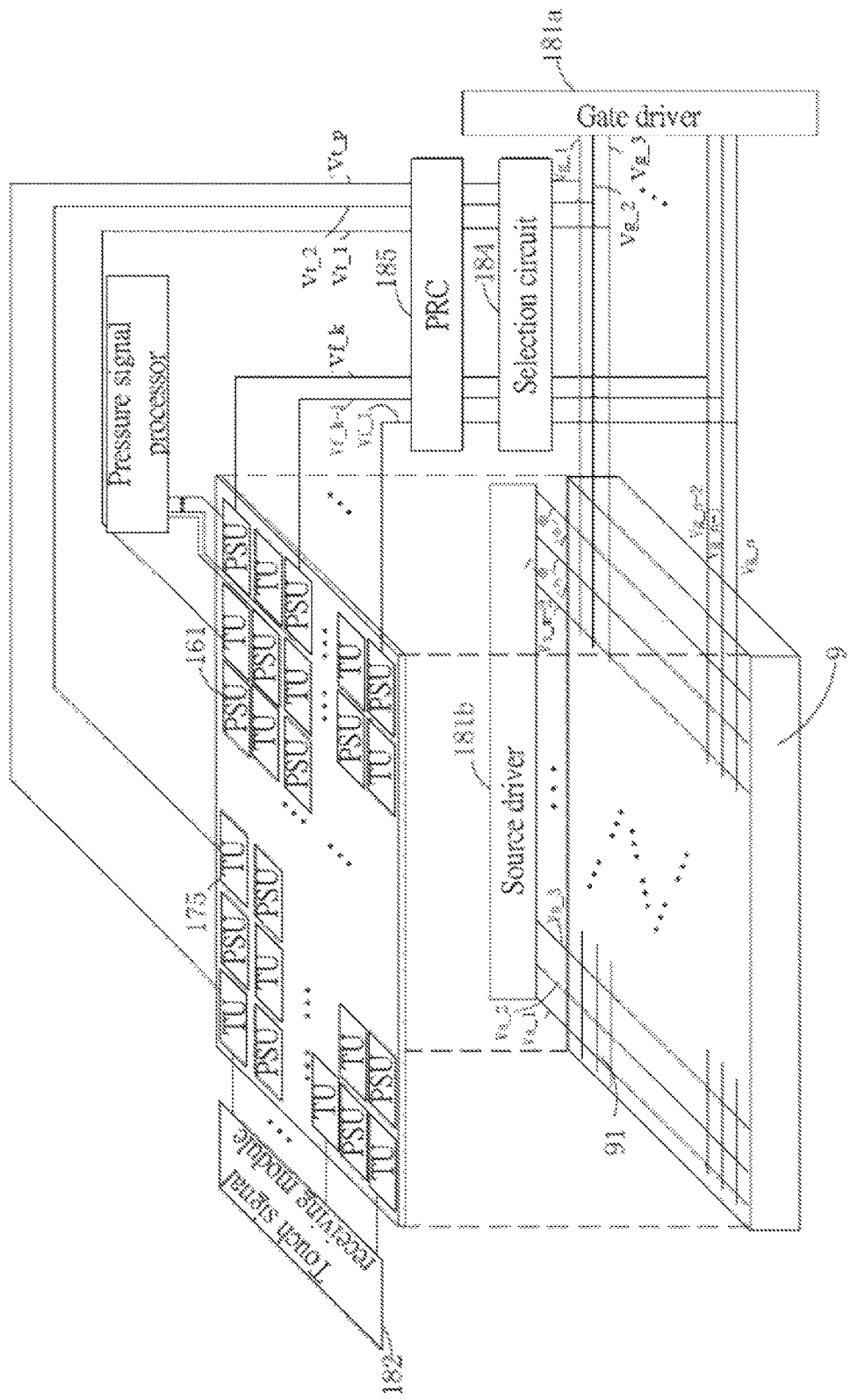
FIG. 5A is a three-dimensional structure of the touch display module having the pressure detection mechanism in the first embodiment of the present invention.

Reference is now made to FIG. 4A and FIG. 5A. The signal processing circuit 15 includes a 3-D controller 18 and a pressure signal processor 19. The pressure signal processor 19 is electrically coupled to the 3-D controller 18. The pressure sensor 16 is electrically coupled to the 3-D controller 18 and the pressure signal processor 19. The touch sensor 17 is electrically coupled to the 3-D controller 18.

The pressure signal processor 19 performs processing on the pressure signal transmitted by the pressure sensor 16. The pressure signal processor 19 includes a bridge 191 and a multiplexer 192. The multiplexer 192 is electrically coupled to the bridge 191.

The 3-D controller 18 includes a gate driver 181a, a source driver 181b, a driving pulse processor 187, a touch signal receiving module 182, a pressure signal receiving module 183 and an integrated processor 186. The gate driver 181a generates gate scan pulses Vg_1~Vg_n according to the display signal to control the refresh time period of the displayed color of the pixel units 91. The source driver 181b generates source scan pulses Vs_1~Vs_n in according to the display signal to control the displayed color intensity of the pixel units 91. The driving pulse processor 187 includes a selection circuit 184 and a pulse rearranging circuit 185 (abbreviated as PRC in FIG. 4A) to process the gate scan pulses Vg_1~Vg_n outputted by the gate driver 181a. The pressure scan pulses Vf_1~Vf_k are provided to the pressure sensing unit 16 by processing the gate scan pulses Vg_1~Vg_n by the selection circuit 184 and the pulse rearranging circuit 185 to control a time period for detecting a value of a pressure received by the pressure sensing unit 161. Further, the touch scan pulses Vt_1~Vt_p are provided to control a time period for detecting a touch point.

In practical operation, in order to match the characteristics and requirements of the touch sensor 17 and the pressure sensor 16, the selection circuit 184 and the pulse rearranging circuit 185 can generate pulse signals suitable for different requirements of various sensors that have pulse widths and amplitudes different from those of the gate scan pulses by processing the gate scan pulse Vg_1·Vg_n outputted by the gate driver 18. In the present invention, the square wave is the most common type of signal processed by the touch display module. However, the present invention is not limited thereto and the signal can be of any type.

After detecting the pressure signal, the pressure sensor 16 transmits the electrical signal to the pressure signal processor 19. The pressure signal processor 19 performs processing on the pressure signal and further transmits the pressure signal to the pressure signal receiving module 183 of the 3-D controller 18. After detecting the touch signal, the touch sensors 17 transmit the touch signal to the touch signal receiving module 182. The integrated processor 186 performs operation on the electrical signal from the touch signal receiving module 182 and the pressure signal receiving module 183.

Figure 4B:
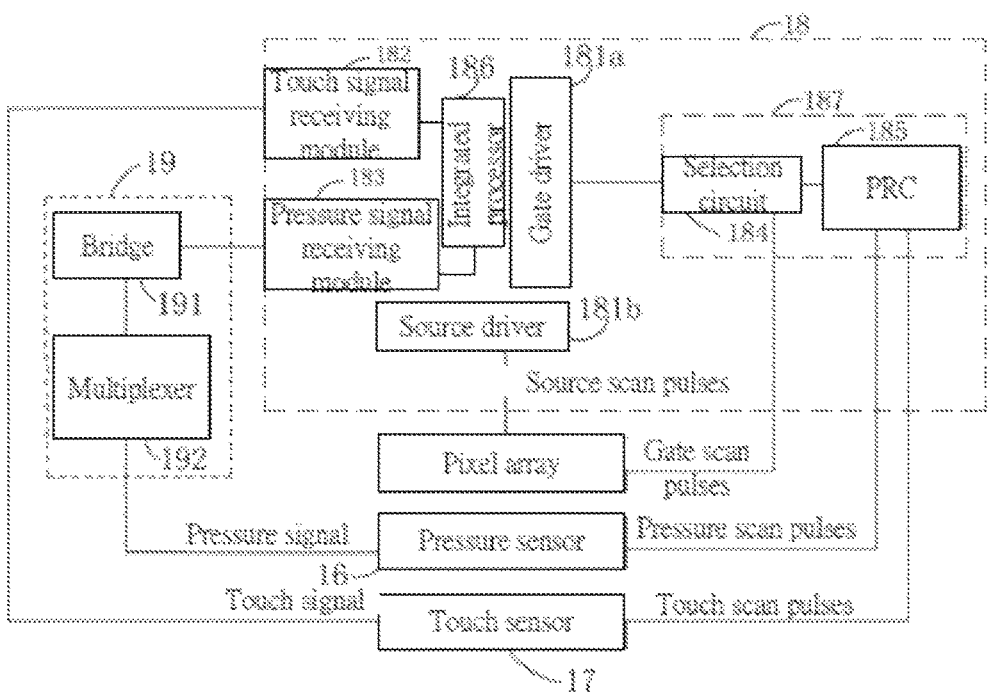
FIG. 4B is a diagram illustrating a variation of the circuit structure module of the touch display module having the pressure detection mechanism in the first embodiment of the present invention.

The selection circuit 184 selects part of the gate scan pulses Vg_1~Vg_n, such as the gate scan pulses corresponding to the odd rows, to be outputted. The pulse rearranging circuit 185 performs processing such as displacing, narrowing the pulse width and frequency-splitting on the pulse signals outputted by the selection circuit 184. Actually, the driving pulse processor 187 may include only the pulse rearranging circuit 185 or the selection circuit 184 to accomplish the selection or processing of the gate scan pulses Vg_1~Vg_n by using the selection circuit 184 or the pulse rearranging circuit 185. As illustrated in FIG. 4B, after the gate driver output signal is processed by the selection circuit 184, the gate scan pulses are provided. After the gate driver output signal is processed by the selection circuit 184 and the pulse rearranging circuit 185, the pressure scan pulses and the touch scan pulses are provided. The pressure signal processor 19 and the 3-D controller 18 can be disposed separately or be disposed on the same chip.

Figure 5B:
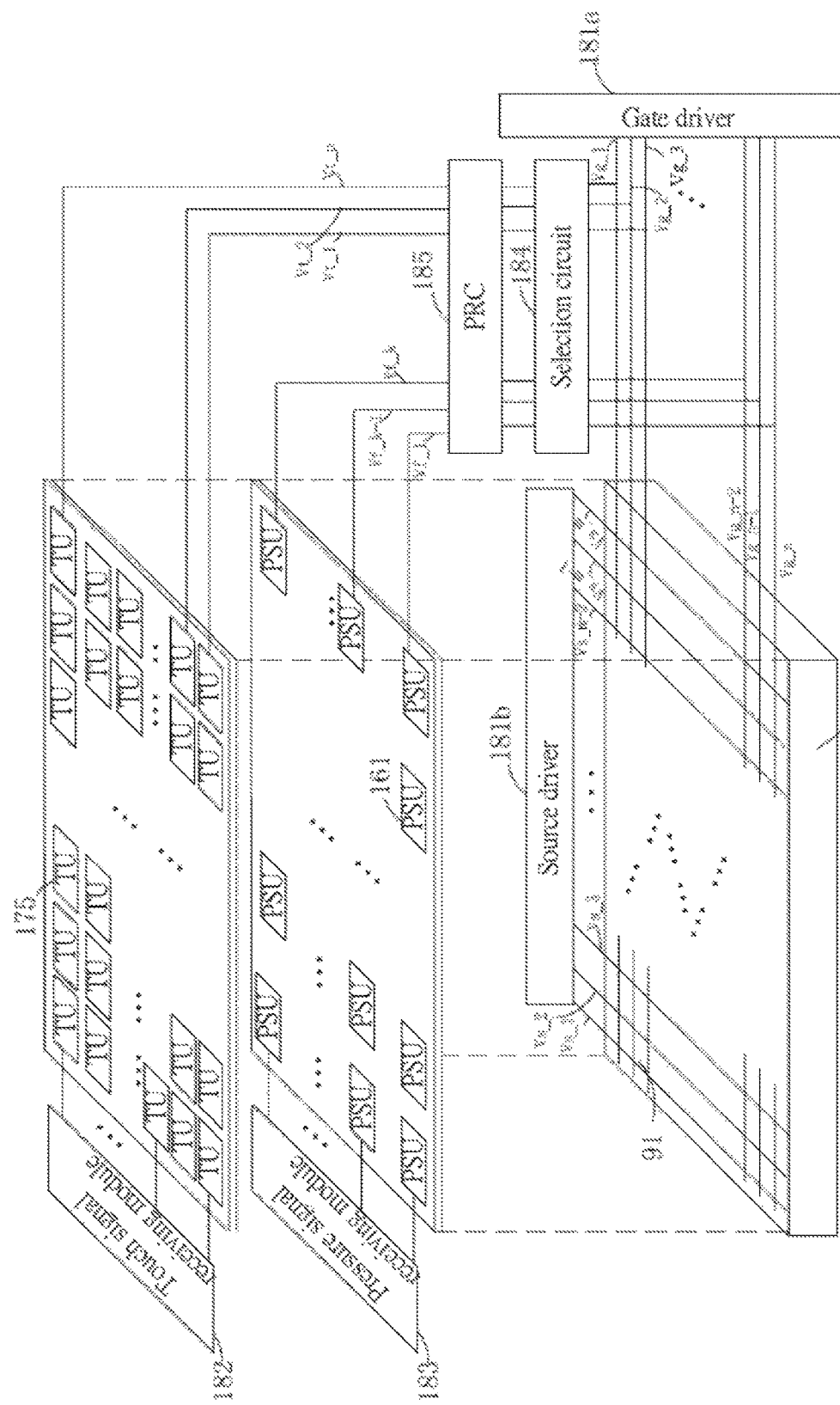
FIG. 5B is a variation of the three-dimensional structure of the touch display module having the pressure detection mechanism in the first embodiment of the present invention.

Reference is now made to FIG. 5A and FIG. 5B. FIG. 5A illustrates an embodiment of a 3-D sensor 13 disposed on a single layer, wherein the pressure sensing units 161 and the touch units 171 are interlaced. FIG. 5B illustrates a variation embodiment that the pressure sensing units 161 and the touch units 171 are disposed on different layers.

Figure 6:
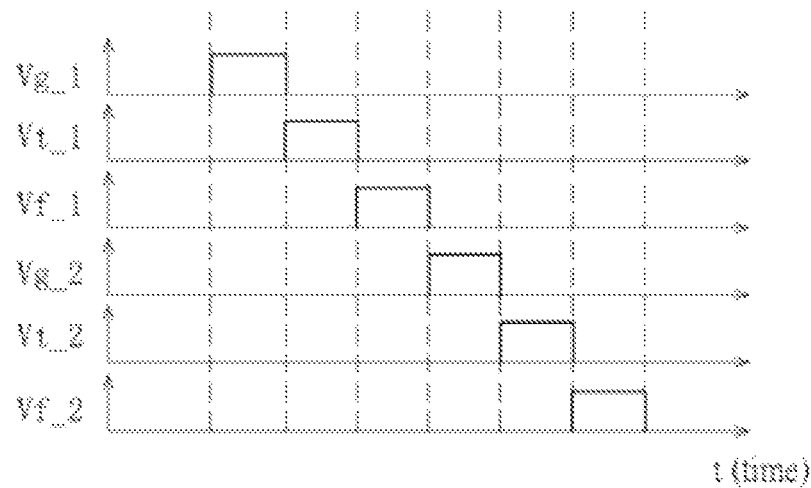
FIG. 6 is a timing diagram of the touch scan pulses, the pressure scan pulses and the gate scan pulses of the touch display module having the pressure detection mechanism in the first embodiment of the present invention.

Reference is now made to FIG. 6. The gate driver 181a provides the gate scan pulses Vg_1~Vg_n such that the gate scan pulses are processed by the selection circuit 184 and the pulse rearranging circuit 185 to form the timing diagram of the touch scan pulse and the pressure scan pulse illustrated in FIG. 6 (the timing diagrams in the present disclosure only use several specific groups of timing diagrams to represent the variation trend of the electrical signal, and the actual number of the timing diagrams matches the number of the first direction touch electrodes 171, the second direction touch electrodes 172 and the pressure sensing units 161). Vg_1 and Vg_2 stand for the refresh time period of the gate scan pulse of two different pixel units 94. Vt_1 and Vt_2 stand for the refresh time period of the touch scan pulse of three different touch units (TU) 175. The signal processing circuit 15 detects the touch point of the finger or the touch stylus according to the time period of the touch scan pulse. Vf_1 and Vf_2 stand for the refresh time period of the pressure scan pulse of two different pressure sensing units (PSU) 161. The signal processing circuit 15 detects the pressure value received by the touch point according to the time period of the pressure scan pulse.

The gate scan pulses Vg_1 and Vg_2, the touch scan pulse Vt_1 and Vt_2 and the pressure scan pulse Vf_1 and Vf_2 are provided in different time periods in an interlace manner, and no time interval exists therebetween. The different time periods avoid the electrical interference therebetween. Preferably, a time interval is disposed between the neighboring gate scan pulse and the touch scan pulse, between the neighboring touch scan pulse and the pressure scan pulse and between the neighboring gate scan pulse and the pressure scan pulse. Since interference occurs easily when the signals are processed at the voltage transition points, the noise-proof ability of the touch display module having the pressure detection mechanism is increased when the voltage transition points of the signals are separated.

Figure 7:
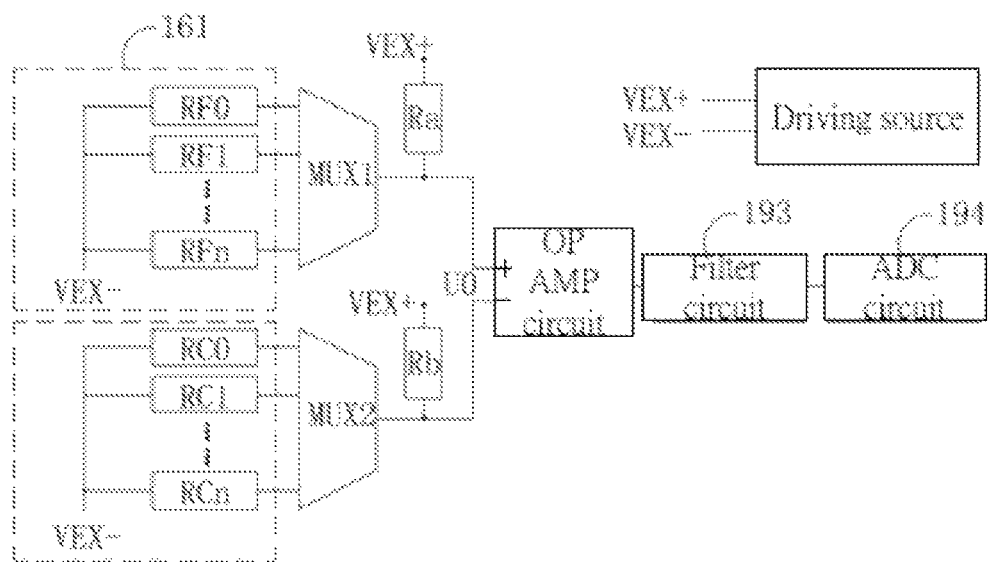
FIG. 7 is a diagram illustrating the circuit structure of the pressure signal processor in FIG. 4A.

Reference is now made to FIG. 7. The pressure signal processor 19 includes a bridge 191 and a multiplexer 192. The multiplexer 192 includes a first multiplexer MUX1 and a second multiplexer MUX2. The bridge 191 includes at least one resistor Ra, at least one resistor Rb and an operational amplifying (OP AMP) circuit (not labeled). The output terminals of the first multiplexer MUX1 and the second multiplexer MUX2 serve as the input signal U0 of the operational amplifying circuit and are electrically coupled to the non-inverting input terminal and the inverting input terminal respectively. The output terminal of the operational amplifying circuit is coupled to the filter circuit 193 and an ADC circuit 194. Under such a condition, the electrical signal outputted by the operational amplifying circuit can be filtered to remove the noise by the filter circuit 193 and be transmitted to the ADC circuit 194 to perform digital conversion. The output terminal of the first multiplexer MUX1 is coupled to a terminal of the resistor Ra, and the other terminal of the resistor Ra is electrically coupled to a positive terminal VEX+ of a driving source. The output terminal of the second multiplexer MUX2 is coupled to a terminal of the resistor Rb, and the other terminal of the resistor Rb is electrically coupled to the positive terminal VEX+ of the driving source. It is appreciated that the resistors Ra and Rb in the present invention are the resistors shared in the bridge and are called common resistors. In related embodiments, the driving source is established by using a single power source or a double power sources. However, the establishment of the driving source is not limited thereto. The driving signal can use an appropriate given signal such as a square wave, a sine wave or a fixed voltage signal. However, the type of the signal is not limited thereto. Preferably, the driving source can use any pressure scan pulse having a type of square wave scan pulse disclosed in each embodiment in the present description as the signal provided from the driving source to drive the pressure sensor 16 to detect the variation.

The input terminal of the first multiplexer MUX1 is coupled to a first group of a plurality of pressure sensing units 161 of the pressure sensor 16. The first group of the pressure sensing units 161 each corresponds to inner resistors RF0, RF1, RF2, . . . , Rfn. When the user touches the substrate 11 to generate a certain pressure, the resistances of the inner resistors RF0, RF1, RF2, . . . , RFn corresponding to the first group of the pressure sensing units 161 under the top substrate 11 vary. The first multiplexer MUX1 selects one of the inner resistors RF0, RF1, RF2, . . . , RFn as the input.

The input terminal of the second multiplexer MUX2 is coupled to a second group of a plurality of pressure sensing units 161 of the pressure sensor 16. Each of the pressure sensing units 161 in the second group corresponds to one of the resistors RC0, RC1, RC2, . . . , RCn, in which the resistors RC0, RC1, RC2, . . . , RCn are disposed neighboring to the resistors RF0, RF1, RF2, . . . , RFn correspondingly and match the resistors RF0, RF1, RF2, . . . , RFn respectively. For example, the resistor RC0 is disposed around the resistor RF0, and the resistor RC1 is disposed around the resistor RF1, so on and so forth. The resistors RC0, RC1 RC2, . . . , RCn serve as the reference resistors of the resistors RF0, RF1, RF2, . . . , RFn. The second multiplexer MUX2 selects one of the resistors RC0, RC1, RC2, . . . , RCn as the input. When the pressure sensing units 161 corresponding to the resistors RF0, RF1, RF2, . . . , RFn are pressed, the resistors RC0, RC1, RC2, . . . , RCn serve as the reference resistors of the resistors RF0, RF1, RF2, . . . , RFn. On the other hand, when the pressure sensing units 161 corresponding to the resistors RC0, RC1, RC2, . . . , RC are pressed, the resistors RF0, RF0, RF2, . . . . , RFn serve as the reference resistors of the resistors RC0, RC1, RC2, . . . , RCn and as terminal of each of them is coupled to the negative terminal of the driving source VEX−.

Figure 8A:
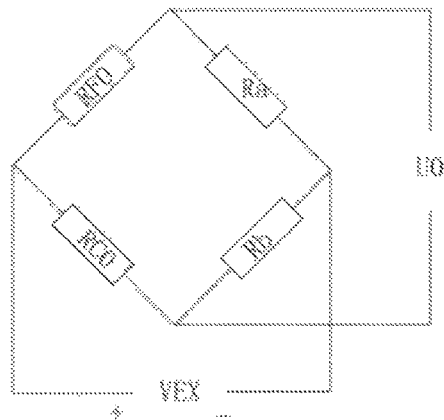
FIG. 8A is a diagram illustrating the theory of the pressure signal detection in FIG. 7.

Reference is now made to FIG. 8A. The operation mechanism of the pressure sensor 16 is described by using the selection of the resistor RE0 by the first multiplexer MUX1 and the selection of the resistor RC0 by the second multiplexer MUX2. The resistor RF0, the resistor RC0 and the resistors Ra and Rb form the Wheatstone bridge. When there is no pressure applied, the Wheatstone bridge is under a balance status. The driving source provides a voltage-stabilizing power to the bridge 191. The polarity of the voltage-stabilizing power is not taken into consideration when the voltage-stabilizing power is used. In the present embodiment, the direct current voltage-stabilizing power is preferably used. When the user performs operation on the top substrate 11, a pressure is applied to the top substrate 11. One or more of the resistances of the resistors RF0, RF1, RF2, . . . . , RFn in the pressure sensing units 161 vary. Under such a condition, the balance of the Wheatstone bridge is broke and results in changes of the output electrical signal U0, in which different changes of the resistances correspond to different pressure values. As a result, by computing and processing of the outputted signal U0 of the Wheatstone bridge, the corresponding pressure value can be obtained. Actually, a common resistor can be disposed to replace the resistors RC0, RC1, RC2, . . . , RCn according to the requirements.

Figure 8B:
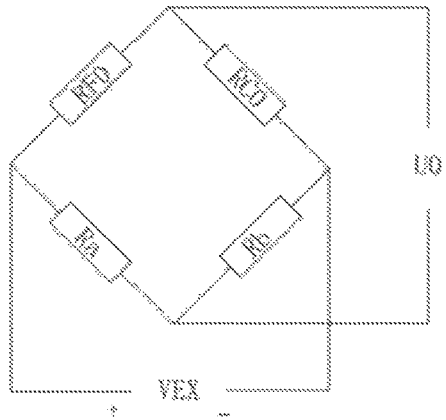
FIG. 8B is another diagram illustrating the theory of the pressure signal detection in FIG. 7.

In a selective embodiment, as illustrated in FIG. 8B, the resistors Ra and Rc0 can be interchanged to form another type of bridge.

It is appreciated that in a preferable embodiment, variable resistors can be selected as the resistors (e.g. the resistors Ra and Rb). By dynamic adjustment of the programmable circuit, the balance of the bridge formed by the resistors RFn, RCn, Ra and Rb can be accomplished.

Comparing to the current technology, the touch display module 10 having the pressure detection mechanism provided in the present invention has the advantages described below:

1. Since the capacitive touch module performs touch point detection based on the induced current of the human body, when the touch units and the pressure sensing units 161 are disposed on the same substrate layer 14, the arrangement of the components and the conductive wires are close. The signal interference is severe and results in inaccurate detection of the touch point position and the pressure value. The present invention makes use of the selection circuit 184 and/or the pulse rearranging circuit 185 to process the gate driving scan pulses provided to the pixel units and outputted by the gate driver 181a. The selection circuit 184 and/or the pulse rearranging circuit 185 can perform processing of displacing, frequency band shortening and frequency splitting on the gate driving scan pulses to further provide the pressure scan pulses and the touch scan pulses. The gate scan pulses, pressure scan pulses and the touch scan pulses can be provided in different time periods or in the same time period. When the pulses are provided in the same time period, two or three of the gate scan pulses, pressure scan pulses and the touch scan pulses are provided at the same time while a transition point of a voltage level thereof are separated (the signals are easily interfered by external circuits at the voltage transition point such that the electrical signals are not stable or the signals may displaces). Such a design makes the touch display module 10 having the pressure detection mechanism responses quickly. The interference between signals decreases and the stability of the touch detection is better. When different time periods are used, the gate scan pulses, the touch scan pulses and the pressure scan pulses are provided in different time periods. As a result, the interference between signals decreases, and the stability of the touch detection of the touch display module 10 having the pressure detection mechanism increases greatly.

2. At least one mask layer is disposed between the pixel units and the touch units 171 and/or between the at least one pressure sensing unit 161 and the touch unit 171. The mask layer efficiently decreases the signal interferences between the touch panel 8 and the display panel 9 and between the touch units and the pressure sensing units.

3. The touch display module 10 having the pressure detection mechanism not only detects the position of the touch points but also the pressure value of the touch points. The touch sensor 17 and the pressure sensor are driven by the same gate driver 181a. The hardware cost is reduced and the circuit design is simplified. The integrity of the touch display module 10 having the pressure detection mechanism increases and the thickness and the weight of the touch display module 10 having the pressure detection mechanism decrease. Since the structures of conductive wires of the touch sensor 17, the pressure sensor 16 and the display panel 9 are close, if the current technology is adapted to use different drivers to drive the pixel units 91, the touch units 175 and the pressure sensing units 161, there is little space for the design, and the compact arrangement of the components is not good for heat-dissipation. The present invention solves such a problem.

4. The detection of the pressure value is performed by using Wheatstone bridge in the present invention, in which the Wheatstone bridge has a simple circuit configuration and high control accuracy. The most important part is that the pressure signal processor 19 uses a combination of the bridge 191 and the multiplexer 192 to use the multiplexer 192 selects different pressure sensing units 161. However, the Wheatstone bridge formed when different pressure sensing units 161 are used to detect the pressure signals, the resistors Ra and Rb are common resistors. Such a design decreases the number of the resistors in the Wheatstone bridge. Further, when different pressure sensing units 161 are used to detect the pressure signals, the error rate between different pressure sensing units 161 decreases since part of the hardware are shared. Furthermore, the resistances RC0, RC1, RC2, . . . , RCn are disposed corresponding to the inner resistances RF0, RF1, RF2, . . . . , RFn and serve as the reference resistors to each other. The reference resistors are disposed neighboring to the resistances RF0, RF1, RF2, . . . . , RFn such that they are affected by the temperature and the noise equally. Such a configuration stabilizes the Wheatstone bridge and lowers the error detection of the signal due to the environment factor such as the temperature variation of the hardware itself. Since the resistors RF0, RF1, RF2, . . . . , RFn and the resistors RC0, RC1, RC2, . . . . , RCn serve as the reference resistors to each other, the noise is lowered and the resource allocation is optimized at the same time. The output signal terminal of the Wheatstone bridge is coupled to the operational amplifying circuit that not only amplifies the outputted signal U0 but also lower the noise due to the noise suppression characteristic of the operational amplifying circuit. Take the resistors RF0 and RC0 as an example, when the top substrate 11 receives a pressure, the variation of the resistor RF0 is $\Delta r$. However, the noise $\Delta s$ of the resistance of the resistor RF0 is generated due to the temperature and other interference. For the reference resistor RC0, the noise caused by the temperature and other interferences is the same as that of the resistor RF0 neighboring thereto, which is $\Delta s$ too. After being inputted to the inverting input terminal of the operational amplifying circuit, the noise $\Delta s$ cancels out the noise of the pressure-sensitive resistor RF0 coupled to the non-inverting input terminal. Accordingly, the interference brought by other noises is greatly reduced to increase the detection accuracy of the pressure signal. Actually, other possible methods to cancel the noise in the operational amplifying circuit can be used. For example, $U=A((V+)-(V-))=A((V\Delta r+V\Delta s)-(-V\Delta r+V\Delta))=2AV\Delta r$. $\Delta s$ is the noise generated externally that is not affected by the inverting voltage. The method of using differential amplifier or an amplifier combination can be adapted in the present invention. The method for canceling the noise is not limited thereto. The circuit and method for canceling the noise generated externally is within the scope of the present invention.

5. In the present embodiment, the pressure sensing units 161 in the non-touch area 174 of the touch units. By disposing the insulating bulk 173, the pressure sensing units 161 and the touch units can be integrated on a same surface. The thickness of the touch display panel 10 having the pressure detection mechanism can be lowered. Especially the complementary disposition of the touch units and the pressure sensing units 161 accomplishes a better display result of the touch display panel 10 having the pressure detection mechanism.

Figure 9:
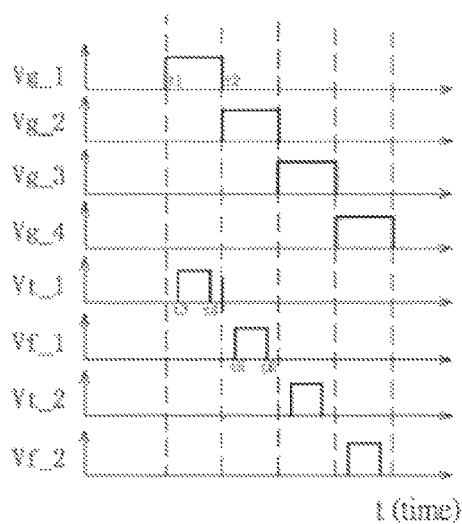
FIG. 9 is a timing diagram of the touch scan pulses, the pressure scan pulses and the gate scan pulses of the touch display module having the pressure detection mechanism in the second embodiment of the present invention.

Reference is now made to FIG. 9, which illustrates a touch display panel (not labeled) having the pressure detection mechanism in a second embodiment of the present invention. The difference between the touch display panel having the pressure detection mechanism in the present embodiment and the touch display panel 10 having the pressure detection mechanism in the first embodiment is that the variation of the time period of the touch scan pulses, the pressure scan pulses and the gate scan pulses are different. In the present embodiment, the touch scan pulses and the pressure scan pulses and the gate scan pulses are provided in the same time period. However, the touch scan pulses and the pressure scan pulses are provided in different time periods. The pulse widths of the touch scan pulses and the pressure scan pulses become narrower after be processed by the driving pulse processing circuit. A time interval thus exists among the touch scan pulses and the pressure scan pulses and the gate scan pulses. For example, in Vg_1, the gate scan pulses switch the voltage level at times t1 and t2. In Vt_1, the pulse width of the touch scan pulses is smaller than that of the gate scan pulse, and the voltage level of the touch scan pulses transits at times t3 and t4. In Vf_1, the pulse width of the pressure scan pulse is smaller than that of the gate scan pulse, and the voltage level of the pressure scan pulse transits at times t5 and t6, in which t1<t3<t4<t2<t5<t6 such that the voltage transition points of the operation of the pixel units, the touch units and the pressure sensing units are separated. The signal interference between the touch units, the pressure sensing units and the pixel units that occurs easily at the voltage transition points results in the inaccuracy of the detection of the touch point positions and the pressure values. In the present embodiment, the time interval is disposed among the gate scan pulses, the pressure scan pulses and the touch scan pulses to separate the voltage transition points to avoid the signal interference therebetween. In practical operation, only the requirement that the pulse widths of the touch scan pulses and the pressure scan pulses are not wider than the pulse width of the gate scan pulses is needed to be satisfied.

In all of the embodiments of the present invention, the same time period means that the duty ratio of the pressure scan pulses and the touch scan pulses overlaps within the duty ratio (i.e. the voltage level is "1") of the gate scan pulses (not including the overlapping condition of the ends of the timing diagram). Otherwise, the condition meets the different time periods.

Figure 10:
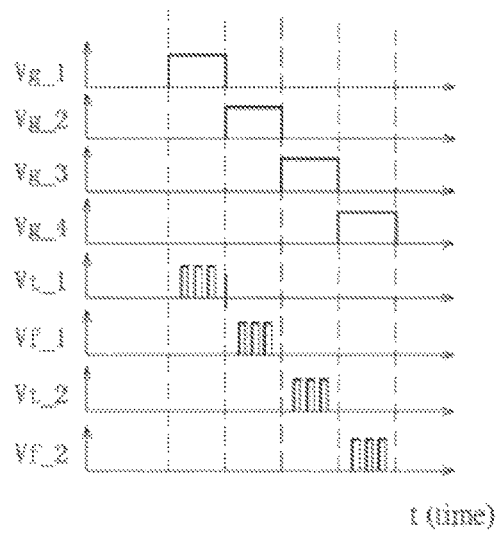
FIG. 10 is a timing diagram of the touch scan pulses, the pressure scan pulses and the gate scan pulses of the touch display module having the pressure detection mechanism in the third embodiment of the present invention.

Reference is now made to FIG. 10, which illustrates a touch display panel (not labeled) having the pressure detection mechanism in a third embodiment of the present invention. The difference between the touch display panel having the pressure detection mechanism in the present embodiment and the touch display panel 10 having the pressure detection mechanism in the second embodiment is that a variation of the time period of the touch scan pulses and the pressure scan pulses occurs. In the present embodiment, the touch scan pulses and the pressure scan pulses are provided at different time periods. Each of one touch scan pulse and one pressure scan pulse includes a plurality of short pulses to decrease the noise. In FIG. 10, only three short pulses are illustrated as an example. In other embodiments, the number of the short pulses can be two or more than two.

Figure 11A:
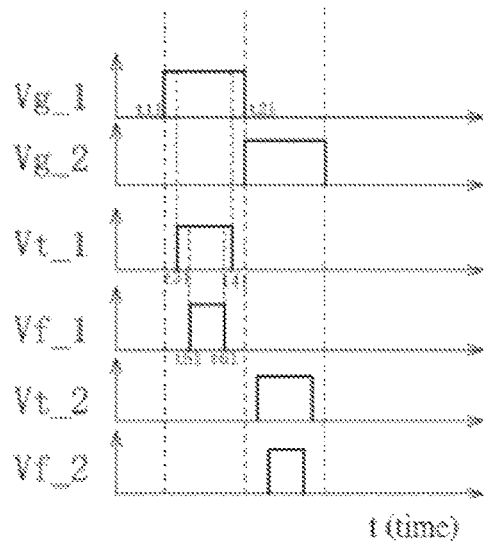
FIG. 11A and FIG. 11B are timing diagrams of the touch scan pulses, the pressure scan pulses and the gate scan pulses of the touch display module having the pressure detection mechanism in the fourth embodiment of the present invention.
Figure 11B:
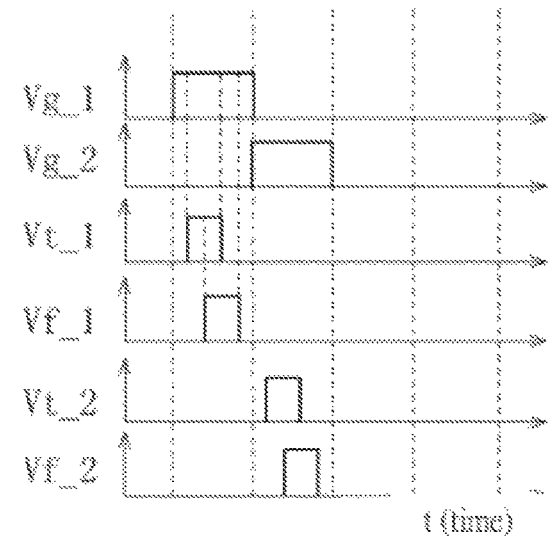

Reference is now made to FIG. 11A, which illustrates a touch display panel (not labeled) having the pressure detection mechanism in a fourth embodiment of the present invention. The difference between the touch display panel having the pressure detection mechanism in the present embodiment and the touch display panels 10 having the pressure detection mechanism in the first and the second embodiments is that in the present embodiment, the gate scan pulses, the touch scan pulses and the pressure scan pulses are provided in the same time period. In FIG. 10, the pulse widths of the gate scan pulses, the touch scan pulses and the pressure scan pulses become narrower sequentially such that the voltage transition points thereof are separated. For example, in Vg_1, the voltage level of the gate scan pulses transits at time periods t11 and t21. In Vt_1, the pulse width of the touch scan pulses is smaller than the pulse width of the gate scan pulses in Vg_1 and the voltage level of the touch scan pulses transits at time periods t31 and t41, in which t11<t31 and t21>t41. In Vf_1, the pulse width of the pressure scan pulses is smaller than the pulse width of the touch scan pulses in Vt_1, in which t51>t31 and t61<t41. The voltage transition points are thus separated. Even if the interference signals are generated, the possibility of the actual occurrence of interference between them is decreased. For example, if the interference signal is generated at the voltage transition point of the pressure scan pulses, the interference signal does not have much influence thereon since the gate scan pulses and the touch scan pulses are stable at that time. The gate scan pulses, the touch scan pulses and the pressure scan pulses are overlapped within a duty cycle. Actually, the pulse widths of the touch scan pulses and the pressure scan pulses are not necessarily limited thereto. The touch scan pulses and the pressure scan pulses can be partially overlapped such that the voltage transition points thereof are separated. As illustrated in FIG. 11B, the touch scan pulses and the pressure scan pulses are provided in the same time period as the time period that gate scan pulses is provided, while the touch scan pulses and the pressure scan pulses are provided in the same time period but the duty cycles thereof are only partially overlapped.

Figure 12:
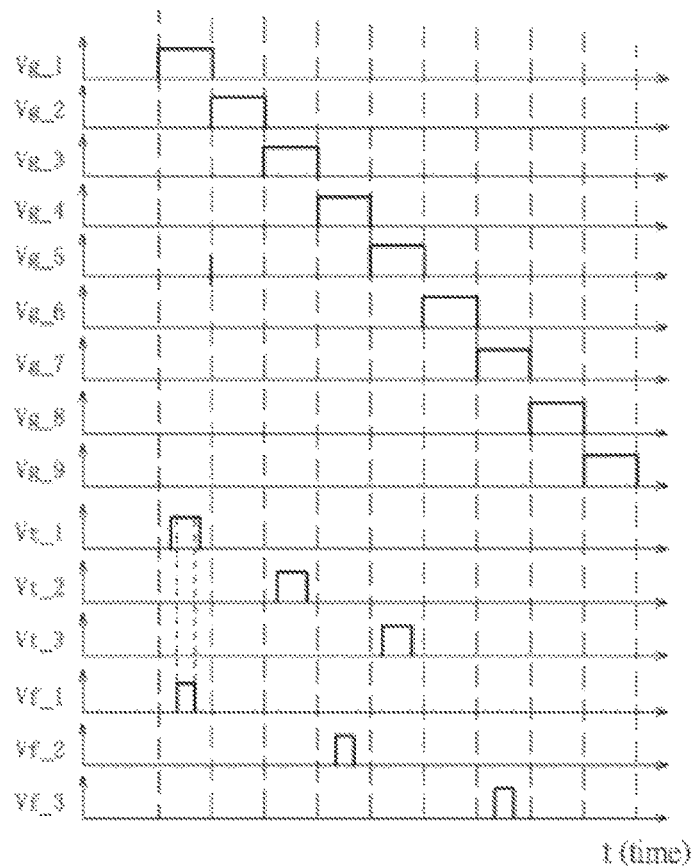
FIG. 12 is a timing diagram of the touch scan pulses, the pressure scan pulses and the gate scan pulses of the touch display module having the pressure detection mechanism in the fifth embodiment of the present invention.

Reference is now made to FIG. 12, which illustrates a touch display panel (not labeled) having the pressure detection mechanism in a fifth embodiment of the present invention. The difference between the touch display panel having the pressure detection mechanism in the present embodiment and the touch display panels 10 having the pressure detection mechanism from the first to the fourth embodiments is that in the present embodiment, the pulse width of the touch scan pulses becomes narrower such that the transition point thereof is separated from that of the gate scan pulses. The pulse width of the pressure scan pulses is narrower than that of the touch scan pulses and the transition point thereof is separated from the transition point of the touch scan pulses. Suppose that the frequency of the gate scan pulses is Fg, the frequency of the touch scan pulses is Ft and the frequency of the pressure scan pulses is Ff. Fg>Ft>Ff. Since the touch display module having the pressure detection mechanism requires that the scan pulse widths of the pixel units, the touch units and the pressure sensing units gradually decreases, the detection of the touch point and the pressure can also be accomplished by decreasing the pulse widths of the touch scan pulses and the pressure scan pulses sequentially relative to the scan frequency of the gate scan pulses. Further, the power dissipation of the touch display module having the detection mechanism decreases as well. Preferably, Fg=(1-20)Ft and Fg=(1-50)Ff.

Figure 13:
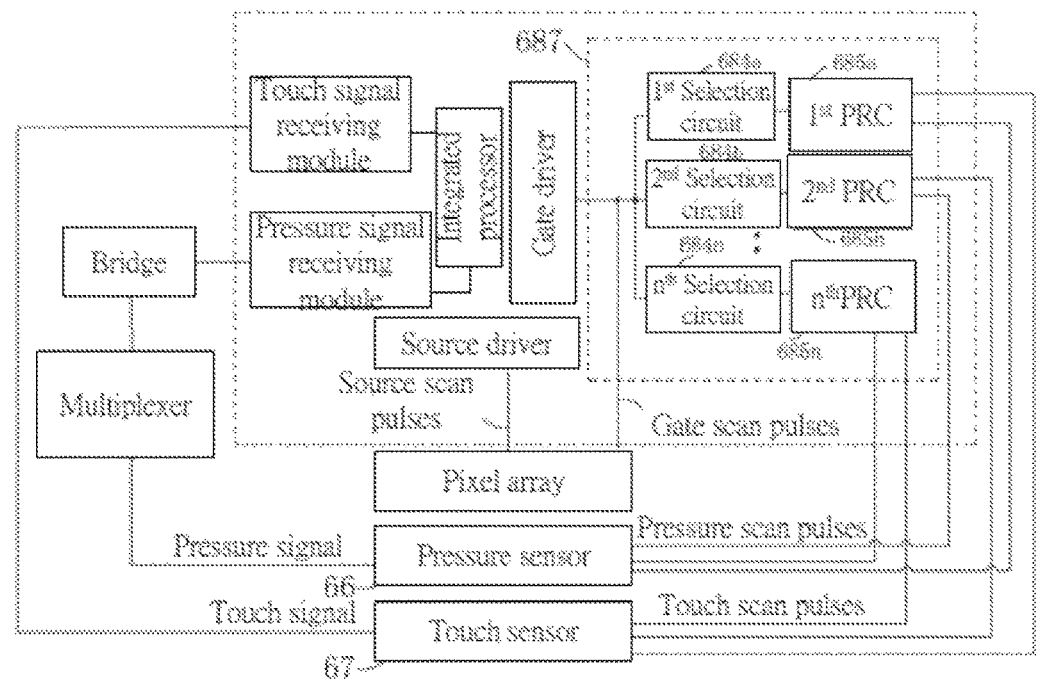
FIG. 13 is a diagram illustrating the circuit structure module of the touch display module having the pressure detection mechanism in the sixth embodiment of the present invention.

Reference is now made to FIG. 13, which illustrates a touch display panel (not labeled) having the pressure detection mechanism in a sixth embodiment of the present invention. The difference between the touch display panel having the pressure detection mechanism in the present embodiment and the touch display panels 10 having the pressure detection mechanism from the first to the fifth embodiments is that in the present embodiment, the driving pulse processor 687 of the touch display module having the pressure detection mechanism includes a plurality of selection circuits and a plurality of pulse rearranging circuits: a first selection circuit 684a, a first pulse rearranging circuit 685b, a second selection circuit 684a, a second pulse rearranging circuit 685b, . . . , a n-th selection circuit 684a, a n-th pulse rearranging circuit 685b. Different groups of the selection circuits and the pulse rearranging circuits provide the touch scan pulses and the pressure scan pulses to different touch units and the pressure sensing units.

Figure 14:
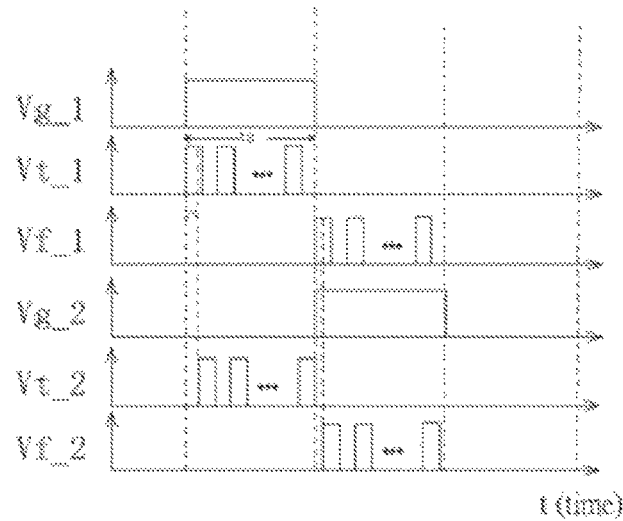
FIG. 14 is a timing diagram of the touch scan pulses, the pressure scan pulses and the gate scan pulses of the touch display module having the pressure detection mechanism in the sixth embodiment of the present invention.

Reference is now made to FIG. 14, two groups of touch units, pressure sensing units and pixel units (not labeled) are used as an example to illustrate the gate scan pulses, the touch scan pulses and the pressure scan pulses outputted by the driving pulse processor 687. Suppose that Vg_1 and Vg_2 are the gate scan pulses received by the pixel unit 1 and the pixel unit 2 of the display panel 9, Vt_1 and Vt_2 are the touch scan pulses received by the touch unit 1 and touch unit 2 on the touch sensor 66, and Vf_1 and Vf_2 are the pressure scan pulses received by the pressure sensing unit 1 and the pressure sensing unit 2 on the pressure sensor 67. The touch scan pulses and the pressure scan pulses received by the pressure sensing unit 1 and the pressure sensing unit 2 are provided in different time periods. A pulse period of the touch scan pulses is tz and includes a plurality of short pulses td. A delay of ts (ts<tz ts≠ntd, n is a positive integer) exists between the initial voltage transition points of the touch scan pulses of the touch unit 1 and the touch unit 2. As a result, the voltage transition points of the touch scan pulses of the touch unit 1 and the touch unit 2 are separated. Similarly, the voltage transition points of the pressure scan pulses of the pressure sensing unit 1 and the pressure sensing unit 2 are separated as well. The interference of the electrical signals between the touch units and the pressure sensing units is decreased. Further, since a plurality of groups of the selection circuits and the pulse rearranging circuits are used to process the gate scan pulses to provide the pressure scan pulses and the touch scan pulses to the pressure sensing units and the touch units simultaneously, the duty cycle is shortened. The interference of the electrical signals is further decreased. The technology to separate the voltage transition points can be used in other embodiments.

Figure 15:
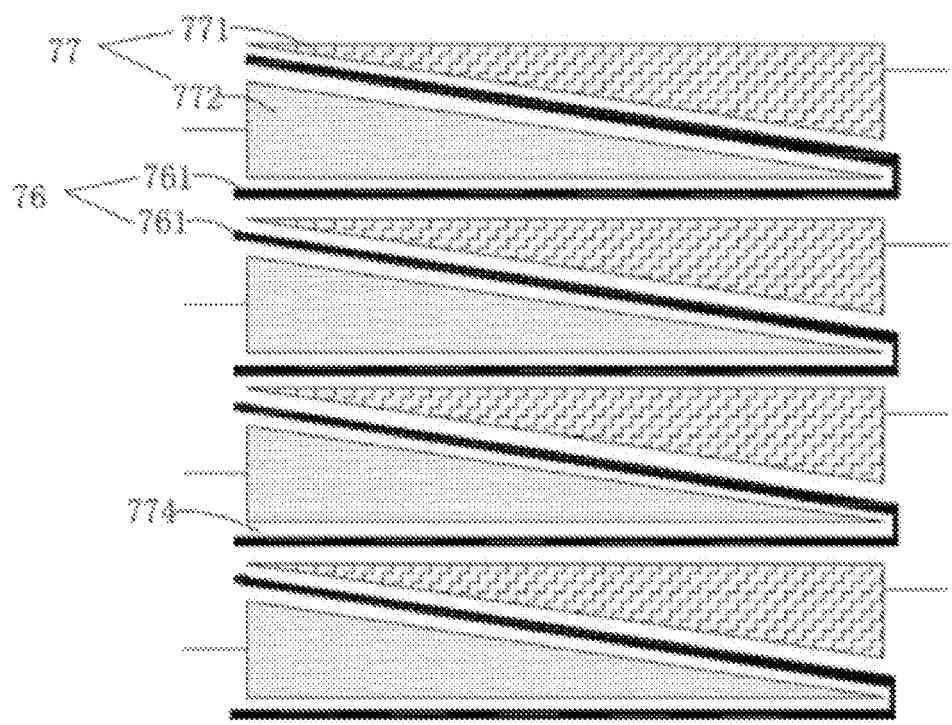
FIG. 15 is a diagram illustrating the planer structure of the electrode pattern layer of the touch display module having the pressure detection mechanism in the seventh embodiment of the present invention.

Reference is now made to FIG. 15, which illustrates a touch display panel (not labeled) having the pressure detection mechanism in a seventh embodiment of the present invention. The difference between the touch display panel having the pressure detection mechanism in the present embodiment and the touch display panels 10 having the pressure detection mechanism from the first to the sixth embodiments is that in the present embodiment, there is no overlapped area among the touch units (not labeled), i.e. there is no overlapped area between two of the first direction touch electrode 771 and the second direction touch electrode 772. A pressure sensing unit 761 is disposed in a non-touch area 774 between two of the first direction touch electrode 771 and the second direction touch electrode 772. The issue that the wire is broken easily due to the overlapping between two of the touch electrodes and between the touch electrode and the pressure sensing unit 761 is avoided. Preferably, the first direction touch electrode 771, the second direction touch electrode 772 and the pressure sensing unit 761 are designed to be complemented to each other. The shape of the first direction touch electrode 771 and the second direction touch electrode 772 are not limited to a specific shape and can be rectangle, triangle or other irregular shapes.

Figure 16A:
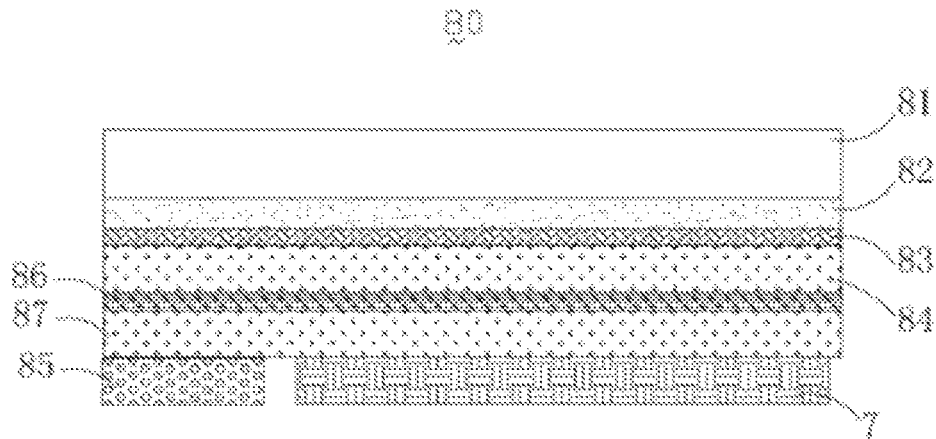
FIG. 16A is a diagram illustrating the layer structure of the touch display module having the pressure detection mechanism in the eighth embodiment of the present invention.

Reference is now made to FIG. 16A, which illustrates a touch display panel 80 having the pressure detection mechanism in an eighth embodiment of the present invention. The difference between the touch display panel 80 having the pressure detection mechanism in the present embodiment and the touch display panels 10 having the pressure detection mechanism from the first to the seventh embodiments is that in the present embodiment, from the top to the bottom, the touch display panel 80 includes a top substrate 81, an adhesive layer 82, a first electrode pattern layer 83, a first substrate layer 84, a second electrode pattern layer 86, a second substrate layer 87, a signal processing circuit 85 and a display panel 7. The first substrate layer 84 and the second substrate layer 87 serve as supporting layers to support the first electrode pattern layer 83 and the second electrode pattern layer 86 respectively. The first substrate layer 84 adheres to the top substrate 81 through the adhesive layer 82. The first substrate layer 84 and the second substrate layer 87 can be flexible substrates having different stress coefficients. As a result, when the pressure sensing units disposed on the flexible substrates having different stress coefficients are pressed, different values of the sensed signals can be obtained to increase the sensitivity. The first electrode pattern layer 83, the second electrode pattern layer 86 and the display panel 7 are electrically coupled to the signal processing circuit 85 through conductive wires (not illustrated). The position of the signal processing circuit 85 are not limited and can be disposed under the second substrate layer 87, above the second substrate layer 87 or one side of the second substrate layer 87.

Figure 16B:
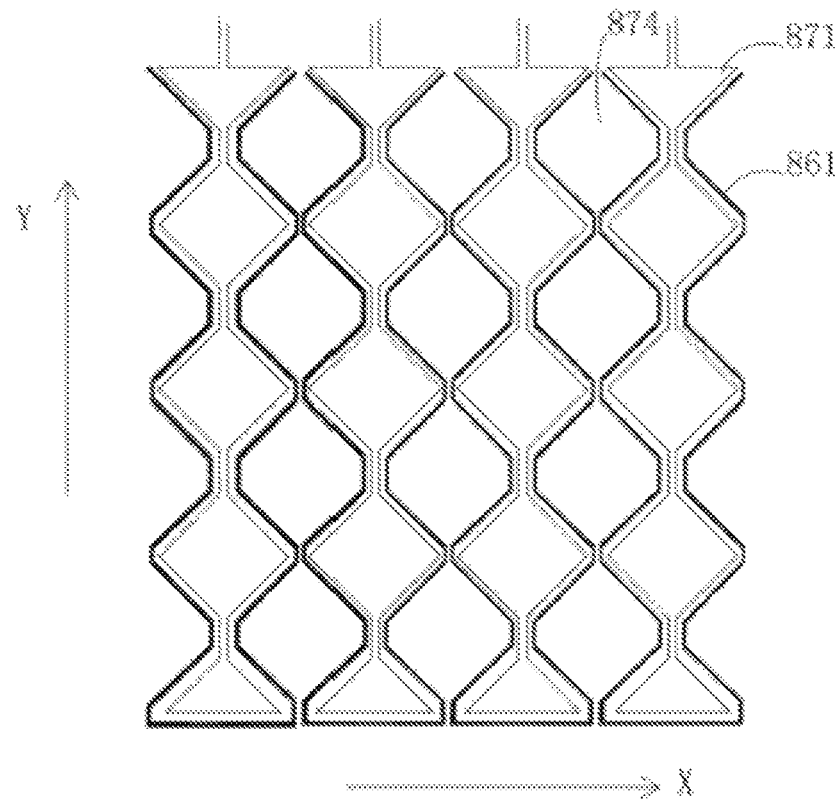
FIG. 16B is a diagram illustrating a planer structure of the electrode pattern layer in FIG. 16A.

Reference is now made to FIG. 16B. The first electrode pattern layer 83 includes as plurality of first direction touch electrodes 871 parallel to each other. Non-touch areas 874 are disposed between two of the first direction touch electrode 871 and pressure sensing units 861 are disposed in the non-touch areas 874. A plurality of second direction touch electrodes (not labeled) parallel to each other are disposed on the top or the bottom surfaces of the second electrode pattern layer 86. The issue that the wires are broken easily due to the overlapping of the touch electrodes can be avoided by separating the first direction touch electrodes 871 and the second direction touch electrodes in different layers.

The second electrode pattern layer 86 can also be disposed on the bottom surface of the first substrate layer 84, or the first electrode pattern layer 83 can be disposed on the top substrate 81 directly and the second electrode pattern layer 86 can be disposed on the first substrate layer 84 such that the disposition of the second substrate layer 87 is avoided to make the touch display module 80 having the pressure detection mechanism thinner.

Figure 17:
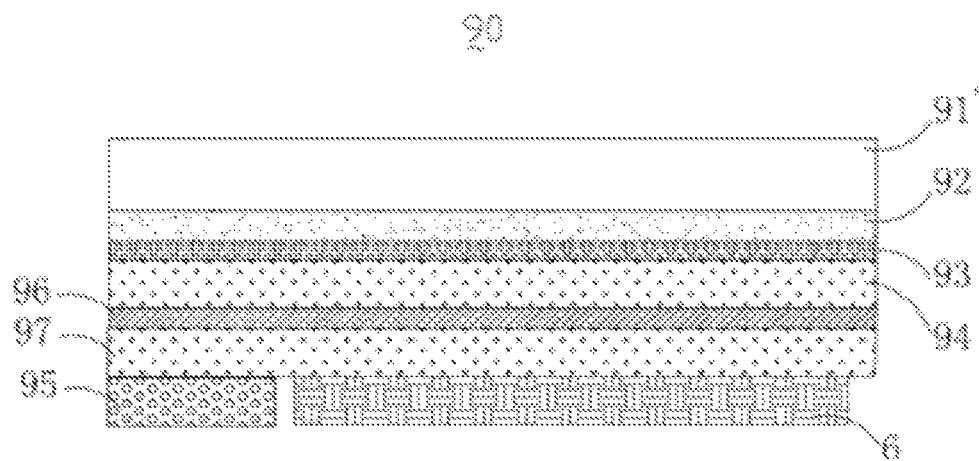
FIG. 17 is a diagram illustrating the layer structure of the touch display module having the pressure detection mechanism in the ninth embodiment of the present invention.

Reference is now made to FIG. 17, which illustrates a touch display panel 90 having the pressure detection mechanism in a ninth embodiment of the present invention. The difference between the touch display panel 90 having the pressure detection mechanism in the present embodiment and the touch display panels 10 having the pressure detection mechanism from the first to the eighth embodiments is that in the present embodiment, the touch display panel 90 having the pressure detection mechanism in the present embodiment further includes a second pressure layer 96. From the top to the bottom, the touch display panel 90 having the pressure detection mechanism includes a top substrate 91' an adhesive layer 92, an electrode pattern layer 93, as first substrate layer 94, a second pressure layer 96, a second substrate layer 97, a signal processing circuit 95 and a display panel 6. The layer that defines a plurality of pressure sensing units (not labeled) on the electrode pattern layer 93 forms a first pressure layer (not labeled). In the present embodiment, the additional second pressure layer 96 is presented. The pressure value can be detected more accurately by superimposing the detection results of the two pressure layers.

Figure 18B:
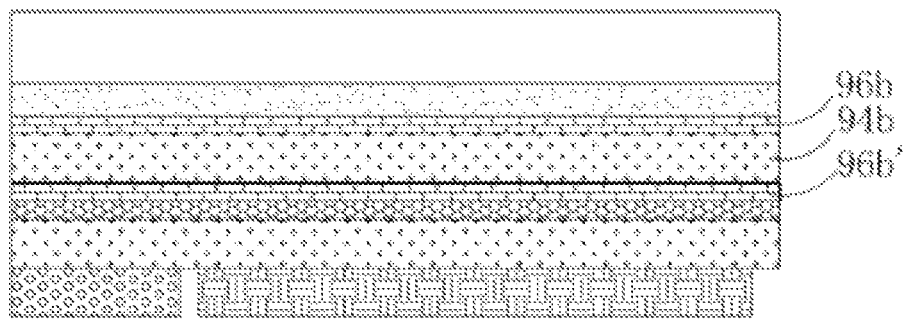
FIG. 18B is a diagram illustrating a second variation of the layer structure of the touch display module having the pressure detection mechanism in the ninth embodiment of the present invention.

Reference is now made to FIG. 18A to FIG. 18B. As a variation of the touch display module 90 having the pressure detection mechanism: in FIG. 18A, the first pressure layer 96a, a second pressure layer 96a' and the touch sensor 97a are disposed on the first substrate layer 94a, the second substrate layer 94a' and the third substrate layer 94a'' from the top to the bottom. At least one mask layer can be disposed between the first pressure layer 96a and a second pressure layer 96a' and between the touch sensor 97a and the display panel 6a. Reference is now made to FIG. 18B. The difference between FIG. 18A and FIG. 18B is that in FIG. 18B, the first pressure layer 96b and the second pressure layer 96b' are disposed on the top and the bottom surfaces on the same substrate layer 94b. In a preferable embodiment, besides that the mask layer is a metal layer, openings that matches the pixel units can be selectively formed to increase the transmittance of the touch display module 90 having the pressure detection mechanism.

Figure 19:
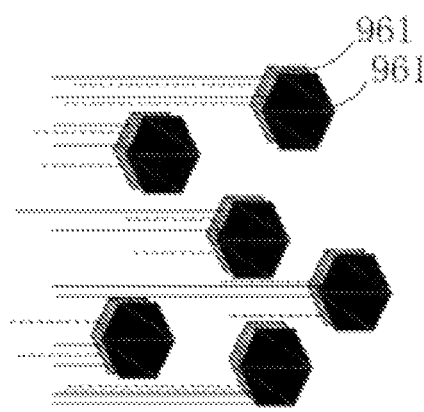
FIG. 19 is a diagram illustrating the effect of partially overlapping the first pressure layer and the second pressure layer of the touch display module having the pressure detection mechanism in the ninth embodiment of the present invention.

Reference is now made to FIG. 19. Preferably, the pressure sensing units 961 disposed on the first pressure layer and the second pressure layer 96 are offset from each other or are staggered such that the pressure sensing units 961 are not exactly corresponding to each other. A vertical projection area of the pressure sensing units 961 of the first pressure layer on the pressure sensing units 961 of the second pressure layer 96 is 10% to 90%, preferably 50% to 80% of the area of a single pressure sensing unit 961.

Figure 20:
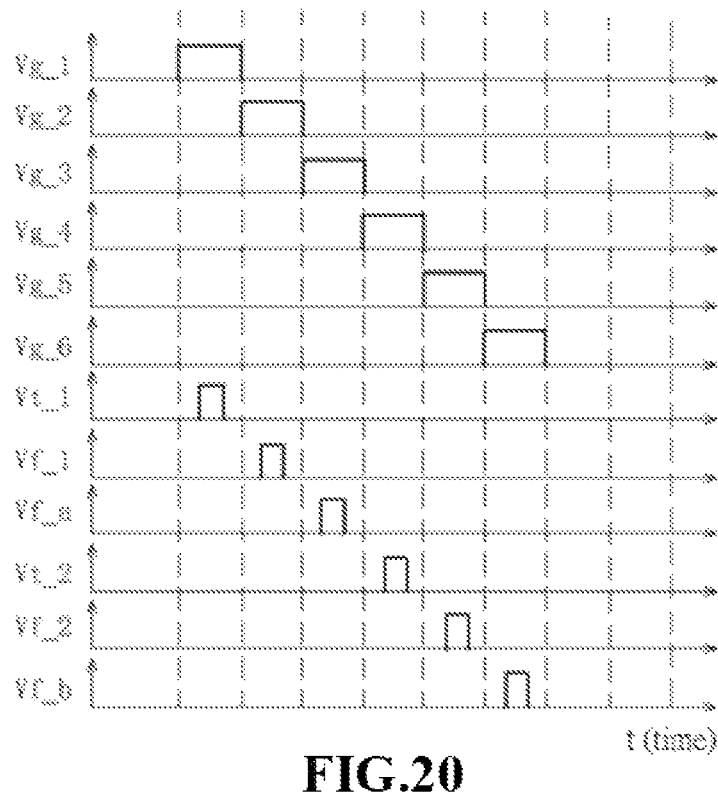
FIG. 20 is a timing diagram of the touch scan pulses, the pressure scan pulses and the gate scan pulses of the touch display module having the pressure detection mechanism in the ninth embodiment of the present invention.

Reference is now made to FIG. 20. Two groups of pixel units, the touch units and the pressures sensing units are used as an example to illustrate the touch scan pulses and the pressure scan pulses outputted by the driving pulse processing circuit (not illustrated). Suppose that Vt_1 and Vt_2 are the touch scan pulse signals received by the touch electrode 1 and the touch electrode 2 respectively, Vg_1 and Vg_2 are the gate scan pulses received by the pixel unit 1 and the pixel unit 2 respectively, Vf_1 and Vf_2 are the pressure scan pulse signals received by the pressure sensing unit 1 and the pressure sensing unit 2 of the first pressure layer respectively, and Vf_a and Vf_b are the pressure sensing unit a and the pressure sensing unit b of the second pressure layer 96. The touch scan pulses, the pressure scan pulses received by the first pressure layer and the pressure scan pulses received by the second pressure layer are provided in different time periods. However, these scan pulses and the gate scan pulses are provided in the same time period. The pulse widths of the touch scan pulses, the pressure scan pulses received by the fast pressure layer and the pressure scan pulses received by the second pressure layer are shortened to separate the voltage transition points to further increase the anti-interference ability between the signals. However, the shortening of the pulse width may not be performed either. The pressure scan pulses or the touch scan pulses may include a plurality of short pulses.

Figure 21:
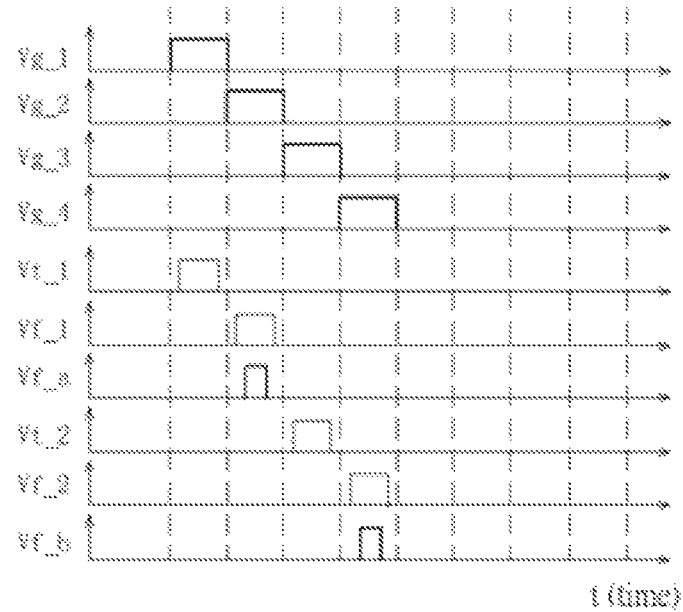
FIG. 21 is a timing diagram of the touch scan pulses, the pressure scan pulses and the gate scan pulses of the touch display module having the pressure detection mechanism in the tenth embodiment of the present invention.

Reference is now made to FIG. 21, which illustrates a touch display panel (not labeled) having the pressure detection mechanism in a tenth embodiment of the present invention. The difference between the touch display panel having the pressure detection mechanism in the present embodiment and the touch display panels 90 having the pressure detection mechanism in the eighth embodiments is that in the present embodiment, the shortened touch scan pulses and the gate scan pulses are provided in the same time period, the pressure scan pulses received by the first pressure layer and the second pressure layer and the gate scan pulses are provided in the same time period, but the pressure scan pulses received by the first pressure layer and the second pressure layer and the touch scan pulses are provided in different time periods. The pulse width of the pressure scan pulses received by the first pressure layer is narrower than the pulse width of the pressure scan pulses received by the second pressure layer. The voltage transition points of the gate scan pulses, the touch scan pulses and the pressure scan pulses are separated to decrease the interference between the signals. Actually, the pulse widths of the scan pulses of the touch electrodes, the first pressure layer and the second pressure layer are not limited once the voltage transition points of the scan pulses of the touch electrodes, the first pressure layer and the second pressure layer is guaranteed to be separated. One or more of the touch scan pulses, the pressure scan pulses of the first pressure layer and the pressure scan pulses of the second pressure layer can be provided in the same time period.

Figure 22:
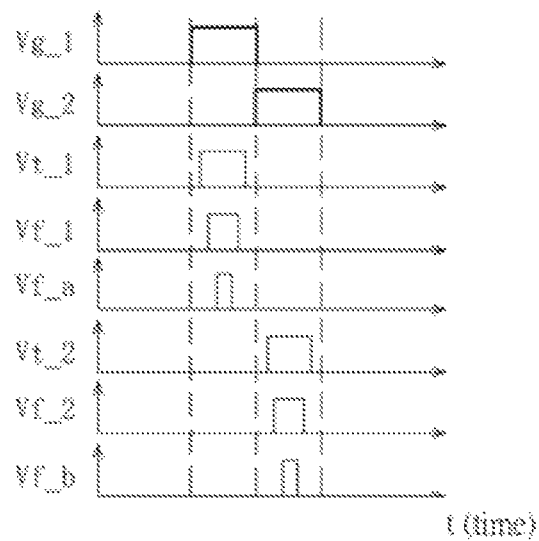
FIG. 22 is a timing diagram of the touch scan pulses, the pressure scan pulses and the gate scan pulses of the touch display module having the pressure detection mechanism in the eleventh embodiment of the present invention.

Reference is now made to FIG. 22, which illustrates a touch display panel (not labeled) having the pressure detection mechanism in an eleventh embodiment of the present invention. The difference between the touch display panel having the pressure detection mechanism in the present embodiment and the touch display panels 90 having the pressure detection mechanism in the eighth embodiments is that in the present embodiment, the gate scan pulses, the touch scan pulse and the pressure scan pluses of the first pressure layer and the second pressure layer are shortened sequentially and are provided in the same time period. The duty cycles thereof are completely overlapped. However, the voltage transition points thereof are separated.

Figure 23:
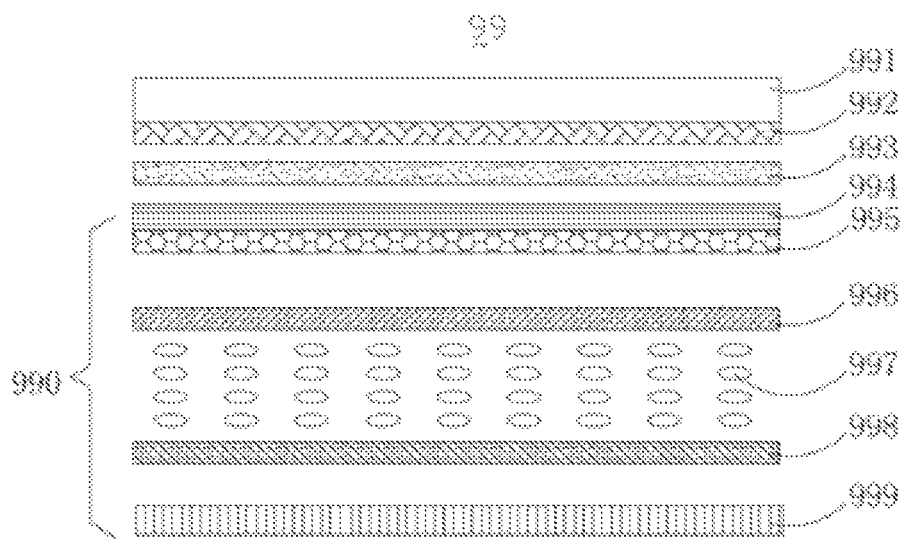
FIG. 23 is a diagram illustrating the layer structure of the touch display module having the pressure detection mechanism in the twelfth embodiment of the present invention.

Reference is now made to FIG. 23. From the top to the bottom, the touch display panel 99 having the pressure detection mechanism in the twelfth embodiment of the present invention includes a top substrate 991, an adhesive layer 992, a pressure layer 993 and a touch display panel 990. From the top to the bottom, the touch display panel 990 includes a top polarizer 994, a touch electrode layer 995, a top substrate 996, a liquid crystal layer 997, a bottom substrate 998 and a bottom polarizer 999. The top substrate 996 and the bottom substrate 998 sandwiches the liquid crystal layer 997. The position of the touch electrode layer 995 is not limited and can be disposed on the bottom surface of the top polarizer 994, the top surface/bottom surface of the top substrate 996, the top surface/bottom surface of the bottom substrate 998 or the bottom surface of the bottom polarizer 999. The touch electrode layer 995 includes a plurality of first direction touch electrodes (not illustrated) and a plurality of second direction touch electrodes (not illustrated). The first direction touch electrodes and the second direction touch electrodes are disposed on any two of the bottom surface of the surface of the top polarizer 994, the top surface/bottom surface of the top substrate 996, the top surface/bottom surface of the bottom substrate 998 or the bottom surface of the bottom polarizer 999 respectively. The pressure layer 993 and the top substrate 991 are adhered through the adhesive layer 992 and are further adhered to the display panel 990 directly. Under such a condition, the pressure layer 993 can be disposed in the touch display panel having the embedded structure (e.g. on-cell or in-cell) rapidly such that the touch display panel 99 having the pressure detection mechanism can have the ability of touch and display and the ability of detecting the pressure value of the touch points simultaneously.

A thirteenth embodiment of the present invention provides a driving method used in a touch display panel having the pressure detection mechanism. The touch display panel having the pressure detection mechanism includes pixel units arranged in an array and a 3-D sensor. The 3-D sensor includes a plurality of touch units and at least one pressure sensing unit. The touch display panel can be any one of the touch display panels described from the first embodiment to the twelfth embodiment of the present invention (the names and the labels of the components mentioned in the present embodiment are used in reference to the names and the labels of the components mentioned in the first embodiment). The driving method of the touch display panel includes the steps outlined below:

S1: providing a gate driving scan pulse to the pixel units 91 to control a refresh time period of the displayed color;

S2: providing a touch scan pulse to a touch unit 175 to control a time period of the detection of a touch point; and S3: providing a pressure scan pulse to a pressure sensing unit 161 to control a time period of the detection of a pressure value;

Wherein the voltage transition points of the gate driving scan pulses, the touch scan pulses and the pressure scan pulses are separated from each other.

The touch scan pulses and the pressure scan pulses can be provided in different time periods or can be provided in the same time period.

Comparing to the current design, the driving method of the touch display panel provided in the present invention can accomplish an advantageous anti-noise performance by separating the voltage transition points.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch display module having a pressure detection mechanism, comprising:
   a plurality of pixel units disposed in an array;
   a plurality of touch units;
   a plurality of pressure sensing units; and
   a pressure signal processor comprising a resistor Ra, a resistor Rb, a multiplexer MUX1 and a multiplexer MUX2,
wherein:
   each of the pressure sensing units corresponds to inner resistors RF0, RF1, RF2, . . . , RFn,
   resistors RC0, RC1, RC2, . . . , RCn are disposed around the pressure sensing units each matching one of the pressure sensing units,
   the inner resistors RF0, RF1, RF2, . . . , RFn and the resistors RC0, RC1, RC2, . . . , RCn are resistors in reference to each other,
   the resistors RF0, RF1, RF2, . . . , RFn are coupled to input terminals of the multiplexer MUX1,
   the resistors RC0, RC1, RC2, . . . , RCn are coupled to input terminals of the multiplexer MUX2,
   the multiplexer MUX1 and the multiplexer MUX2 select a matching one of the resistors RFn and RCn respectively to form a Wheatstone bridge with the resistors Ra and Rb, and
   resistance value changes of the resistors RF0, RF1, RF2, . . . , RFn are related to a pressure value performed thereon.

2. The touch display module having the pressure detection mechanism of claim 1, wherein:
   the pixel units receive a gate driving scan pulse to control a refresh time period of a displayed color,
   the touch units receive a touch scan pulse to control a time period of a detection of a touch point, and
   the pressure sensing units receive a pressure scan pulse to control a time period of a detection of the pressure value,
wherein:
   voltage transition points of the gate driving scan pulse, the touch scan pulse and the pressure scan pulse are separated from each other,
   the gate driving pulse, the touch scan pulse and the pressure scan pulse are provided alternatively in different time periods, and
   pulse widths of the touch scan pulse and the pressure scan pulse are not wider than a pulse width of the gate driving pulse.

3. The touch display module having the pressure detection mechanism of claim 2, wherein the gate driving pulse, the touch scan pulse and the pressure scan pulse are provided directly or indirectly by a same driver.

4. The touch display module having the pressure detection mechanism of claim 1, wherein:
   the pixel units receive a gate driving scan pulse to control a refresh time period of a displayed color, the touch units receive a touch scan pulse to control a time period of a detection of a touch point, and the pressure sensing units receive a pressure scan pulse to control a time period of a detection of the pressure value, wherein:

voltage transition points of the gate driving scan pulse, the touch scan pulse and the pressure scan pulse are separated from each other, and the touch scan pulse and the pressure scan pulse are provided in a same time period as a time period in which the gate driving pulse is provided.

5. The touch display module having the pressure detection mechanism of claim 4, wherein the touch scan pulse and the pressure scan pulse are provided either in a same time period or in separated time periods.

6. The touch display module having the pressure detection mechanism of claim 4, further comprising a first pressure layer having a first pressure sensing unit of the pressure sensing units disposed thereon and a second pressure layer having a second pressure sensing unit of the pressure sensing units disposed thereon.

7. The touch display module having the pressure detection mechanism of claim 6, wherein the pressure scan pulse received by the first pressure sensing unit of the first pressure layer, the pressure scan pulse received by the second pressure sensing unit of the second pressure layer and the touch scan pulse received by the touch units are provided either in a same time period or in separated time periods.

8. The touch display module having the pressure detection mechanism of claim 4, wherein the gate driving pulse, the touch scan pulse and the pressure scan pulse are provided directly or indirectly by a same driver.

9. The touch display module having the pressure detection mechanism of claim 4, wherein the touch scan pulse and the pressure scan pulse are generated by processing the gate driving pulse.

10. The touch display module having the pressure detection mechanism of claim 1, further comprising at least one mask layer, wherein:

the pixel units are disposed at one side of the mask layer, and the touch units and the pressure sensing units are disposed at the other side of the mask layer.

11. The touch display module having the pressure detection mechanism of claim 1, further comprising a mask layer, wherein the mask layer is disposed between the touch units and the pressure sensing units.

12. The touch display module having the pressure detection mechanism of claim 1, further comprising a touch signal receiving module, a pressure signal receiving module and an integrated processor, the touch units are electrically coupled to the touch signal receiving module, the pressure sensing units are electrically coupled to the pressure signal receiving module, and the touch signal receiving module and the pressure signal receiving module are electrically coupled to the integrated processor.

13. The touch display module having the pressure detection mechanism of claim 1, wherein the touch units are defined by a plurality of first direction touch electrodes and a plurality of second direction touch electrodes.

14. The touch display module having the pressure detection mechanism of claim 13, wherein:

the first direction touch electrodes are parallel to each other and the second direction touch electrodes are parallel to each other, the first direction touch electrodes, the second direction touch electrodes and the pressure sensing units are disposed on a same surface, the first direction touch electrodes and the second direction touch electrodes have a certain angle therebetween, a non-touch region is disposed between two of the first direction touch electrodes, the pressure sensing units are disposed in the non-touch region, an overlapped region exists among the pressure sensing units, the first direction touch electrodes and the second direction touch electrodes, and an insulating bulk is disposed between two of the first direction touch electrodes and the second direction touch electrodes within the overlapped region.

15. The touch display module having the pressure detection mechanism of claim 13, wherein:

the first direction touch electrodes, the second direction touch electrodes and the pressure sensing units are disposed on a same surface, no overlapped region exists between two of the first direction touch electrodes and the second direction touch electrodes, a non-touch region is disposed between:
two of the first direction touch electrodes,
two of the second direction touch electrodes or
two of the first direction touch electrodes and the second direction touch electrodes, and the pressure sensing units are disposed in the non-touch region.

16. The touch display module having the pressure detection mechanism of claim 13, wherein:

the first direction touch electrodes are parallel to each other and the second direction touch electrodes are parallel to each other, the first direction touch electrodes and the second direction touch electrodes are disposed on different substrate layers or disposed on different surfaces of a same substrate layer, a non-touch region exists among the first direction touch electrodes, and the pressure sensing units are disposed in the non-touch region.

17. The touch display module having the pressure detection mechanism of claim 13, further comprising a cover plate and a touch display panel, wherein:

from top to bottom, the touch display panel comprises a top polarizer, a top substrate, a liquid crystal layer, a bottom substrate and a bottom polarizer, the first direction touch electrodes and the second direction touch electrodes are disposed on:
a bottom surface of the top polarizer,
a top surface or a bottom surface of the top substrate,
a top surface or a bottom surface of the bottom substrate, or
a bottom surface of the bottom polarizer.

18. The touch display module having the pressure detection mechanism of claim 13, wherein the pressure sensing units are complement to the first direction touch electrodes and/or the second direction touch electrodes.

19. The touch display module having the pressure detection mechanism of claim 1, wherein the pressure signal processor further comprises an operational amplifying circuit, a filter circuit and an Analog-to-Digital Converter (ADC) circuit, wherein output terminals of the multiplexer MUX1 and the second multiplexer MUX2 serve as input signals U0 of the operational amplifying circuit and are electrically coupled to a non-inverting input terminal and an inverting input terminal of the operational amplifying circuit respectively, and wherein an output terminal of the operational amplifying circuit is electrically coupled to the filtering circuit and the Analog-to-Digital Converter (ADC) circuit sequentially.

20. The touch display module having the pressure detection mechanism of claim 1, wherein:
   one terminal of the resistor Ra is coupled to an output terminal of the multiplexer MUX1 and the other terminal of the resistor Ra is coupled to a positive terminal VEX+ of a driving source,
   one terminal of the resistor Rb is coupled to an output terminal of the multiplexer MUX2 and the other terminal of the resistor Rb is coupled to the positive terminal VEX+ of the driving source,
   one terminal of each the resistors RF0, RF1, RF2, . . . , RFn is coupled to one input terminal of the multiplexer MUX1, and the other terminal of each the resistors RF0, RF1, RF2, . . . , RFn is coupled to a negative terminal VEX− of the driving source, and
   one terminal of each the resistors RC0, RC1, RC2, . . . , RCn is coupled to one input terminal of the multiplexer MUX2, and the other terminal of each the resistors RC0, RC1, RC2, . . . , RCn is coupled to the negative terminal VEX− of the driving source.

* * * * *